United States Patent
Deussen et al.

(10) Patent No.: US 11,746,931 B2
(45) Date of Patent: Sep. 5, 2023

(54) CONNECTION ARRANGEMENT

(71) Applicant: Elkamet Kunststofftechnik GmbH, Biedenkopf (DE)

(72) Inventors: Martin Deussen, Marburg (DE); Michael Klein, Hatzfeld-Reddighausen (DE); Michael Ortmueller, Dautphetal-Herzhausen (DE); Andreas Schoch, Marburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 0 days.

(21) Appl. No.: 18/007,485

(22) PCT Filed: Mar. 1, 2022

(86) PCT No.: PCT/EP2022/055137
§ 371 (c)(1),
(2) Date: Jan. 31, 2023

(87) PCT Pub. No.: WO2022/189210
PCT Pub. Date: Sep. 15, 2022

(65) Prior Publication Data
US 2023/0213121 A1 Jul. 6, 2023

(30) Foreign Application Priority Data
Mar. 10, 2021 (DE) .......................... 102021105753.1

(51) Int. Cl.
*F16B 21/08* (2006.01)
*F16L 5/02* (2006.01)

(52) U.S. Cl.
CPC ............ *F16L 5/027* (2013.01); *F16B 21/086* (2013.01); *F16B 21/08* (2013.01)

(58) Field of Classification Search
CPC ........ F16B 21/06; F16B 21/065; F16B 21/08; F16B 21/086; F16L 5/02; F16L 5/027; F16L 5/10; F16L 37/084
(Continued)

(56) References Cited

U.S. PATENT DOCUMENTS 3,379,461 A    4/1968   Davis
6,962,321 B1 * 11/2005  Savage ................ B65D 77/067
                                                137/614.04
(Continued)

FOREIGN PATENT DOCUMENTS

DE           1297418 B      6/1969
WO     WO 2010/081943 A1    7/2010

*Primary Examiner* — Roberta S Delisle
(74) *Attorney, Agent, or Firm* — LEYDIG, VOIT & MAYER, LTD.

(57) ABSTRACT

A connection arrangement includes a first and a second assembly, and an elastically deformable locking element disposed on the first assembly. The locking element is configured to releasably interlock the two assemblies and, during mounting of the two assemblies, to deform into a mounting condition and, after completion of the mounting, to form an undercut which counteracts detachment of the two assemblies. The first assembly has a stop which is movable between an operative position, which assists in maintaining the undercut of the locking element and in which the locking element bears against the stop and/or in which the locking element is deformable against the stop, and a detachment position, in which the stop, in relation to the operative position, is spaced further apart from the locking element and in which the locking element is deformable into a detachment condition for detachment of the two assemblies.

18 Claims, 16 Drawing Sheets

(58) Field of Classification Search
USPC .................................................. 16/2.1, 2.4
See application file for complete search history.

(56) References Cited

U.S. PATENT DOCUMENTS

| | | | |
|---|---|---|---|
| 7,408,122 B2* | 8/2008 | Heimlicher | H02G 3/0658 |
| | | | 174/653 |
| 2005/0077725 A1* | 4/2005 | Bartholoma | H02G 15/04 |
| | | | 285/222 |
| 2008/0163453 A1* | 7/2008 | Joseph | F16F 1/376 |
| | | | 16/2.1 |
| 2011/0318099 A1* | 12/2011 | Le Quere | F16C 1/107 |
| | | | 403/376 |
| 2012/0186039 A1* | 7/2012 | Long | E21B 41/04 |
| | | | 16/2.1 |
| 2015/0048613 A1* | 2/2015 | Bauer | F16L 41/088 |
| | | | 285/192 |

* cited by examiner

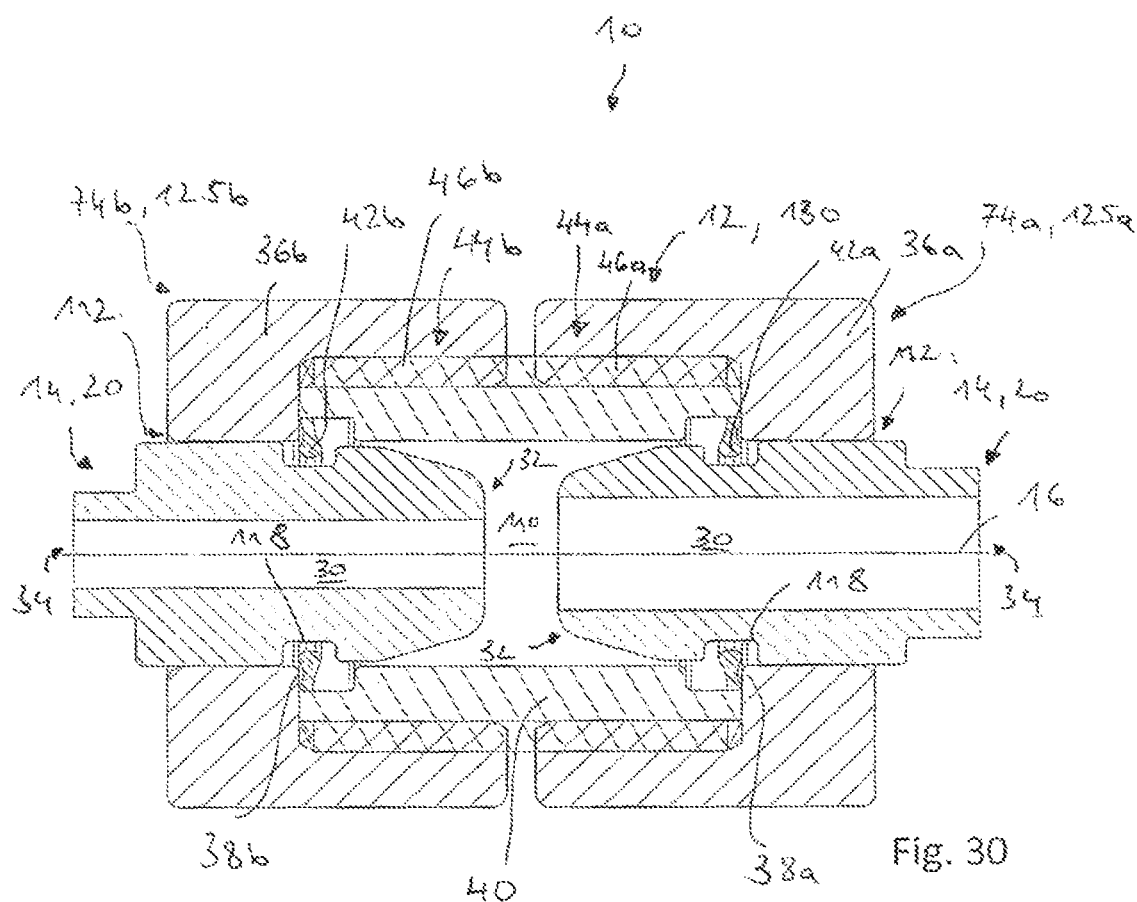

CONNECTION ARRANGEMENT

CROSS REFERENCE TO RELATED APPLICATIONS

This application is a U.S. National Phase application under 35 U.S.C. § 371 of International Application No. PCT/EP2022/055137, filed on Mar. 1, 2022, and claims benefit to German Patent Application No. DE 102021105753.1, filed on Mar. 10, 2021. The International Application was published in German on Sep. 15, 2022 as WO 2022/189210 A1 under PCT Article 21(2).

FIELD

The invention relates to a connection arrangement having a first assembly and a second assembly, an elastically deformable locking element being disposed on the first assembly, which locking element serves to releasably interlock the first assembly and the second assembly and, during mounting of the two assemblies, deforms into a mounting condition and, after completion of the mounting process, forms an undercut which counteracts detachment of the two assemblies.

BACKGROUND

Such connection arrangements are also known as snap-fit connections. By a suitable design of the locking element (e.g., softer or harder), it is possible to achieve lower or higher holding forces as needed, which holding forces hold the two assemblies together in the mounted state of the connection arrangement. However, higher holding forces correspond to correspondingly high detachment forces and may be associated with the risk of the locking element being damaged during detachment.

SUMMARY

In an embodiment, the present invention provides a connection arrangement comprising a first assembly and a second assembly, and an elastically deformable locking element disposed on the first assembly. The locking element is configured to releasably interlock the first assembly and the second assembly and, during mounting of the first assembly and the second assembly, to deform into a mounting condition and, after completion of the mounting, to form an undercut which counteracts detachment of the first assembly and the second assembly. The first assembly has a stop which is movable between an operative position, which assists in maintaining the undercut of the locking element and in which the locking element bears against the stop and/or in which the locking element is deformable against the stop, and a detachment position, in which the stop, in relation to the operative position, is spaced further apart from the locking element and in which the locking element is deformable into a detachment condition for detachment of the first assembly and the second assembly.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 9 is a sectional side view showing the connection arrangement of FIG. 1 in a detached state;

FIG. 9b is an enlarged view of a portion labeled IXb in FIG. 9a;

FIG. 30 is a sectional side view of another embodiment of a connection arrangement including two connector stubs and a duplex coupling.

DETAILED DESCRIPTION

Figure 1:
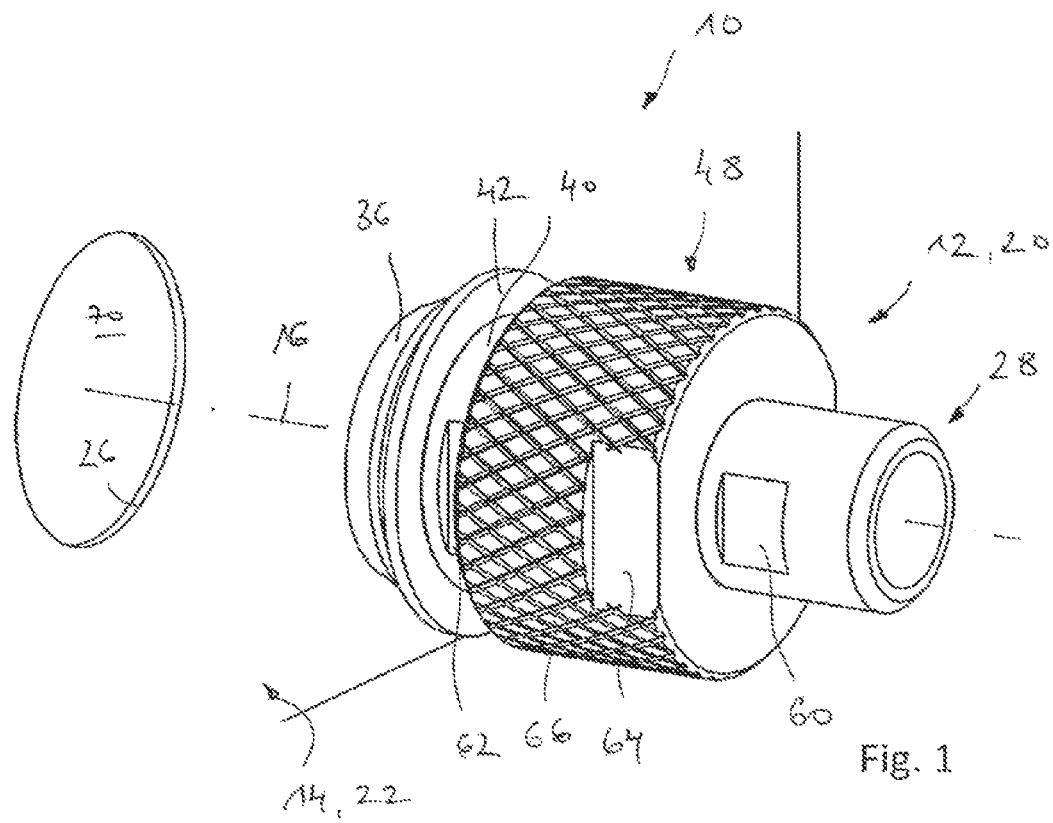
FIG. 1 is a perspective view of an embodiment of a connection arrangement including a container and a connector stub, shown in an initial state prior to the mounting of the connection arrangement.

Based on a connection arrangement of the type mentioned at the outset, embodiments of the present invention allow high holding forces to be combined with low detachment forces, while maintaining the fundamental advantages of a repeatably releasable snap-fit connection.

In a connection arrangement of the type mentioned at the outset, an embodiment of the present invention allows for the high holding forces to be combined with low detachment forces, while maintaining the fundamental advantages of a repeatably releasable snap-fit connection, in that the first assembly has a stop which is movable between an operative position, which assists in maintaining the undercut of the locking element and in which the locking element bears against the stop and/or in which the locking element is deformable against the stop, and a detachment position, in which the stop, in relation to the operative position, is spaced further apart from the locking element and in which the locking element is deformable into a detachment condition for detachment of the two assemblies.

The stop of the first assembly can assume two defined positions relative to the locking element. In an operative position, the stop serves as a supporting element that stabilizes the locking element, which is thus capable of exerting high holding forces. In the detachment position, the stop is spaced further apart from the locking element in relation to the operative position and preferably in a direction parallel to a later described mounting axis or mounting plane of the connection arrangement, so that a clearance is provided. This clearance enables the locking element to deform into its detachment condition substantially unhindered by the stop, thereby allowing the two assemblies to be detached with low detachment forces.

It is understood that the mentioned movement of the stop refers to a movement relative to the locking element. Accordingly, a transfer of the stop from the operative position to the detachment position involves moving only the stop or moving only the locking element, or moving both the stop and the locking element (relative to absolute, stationary spatial coordinates).

The movements mentioned preferably occur along an in particular straight mounting axis or along a mounting plane along which the first assembly and the second assembly are transferred from a detached state to the mounted state and along which the two assemblies are moved away from one another during detachment.

Preferably, the locking element and the stop are fixed relative to each other in the operative position and in the detachment position. In this connection, the locking element and the stop are held to the first assembly, or only one of the two components is held to the first assembly while the other of the two components is subjected to an actuating force which fixes this component in a defined position.

It is preferred if the first assembly has a stop carrier on which the stop is disposed and a locking element carrier on which the locking element is disposed, and if the locking element carrier and the stop carrier are connected via a bearing section in such a way that they are movable relative to each other.

It is possible that the locking element and the locking element carrier may be interconnected, in particular by an interlocking fit or by a material-to-material bond. The locking element and the locking element carrier may be manufactured as an assembly in an injection-molding process, in particular as a two-component assembly in a two-component injection-molding process.

The bearing section preferably defines an axis of relative movement or a plane of relative movement along which the stop carrier and the locking element carrier are movable relative to each other. Preferably, this axis of relative movement or this plane of relative movement corresponds to the mounting axis or to the mounting plane along which the two assemblies are joined together during mounting and moved away from one another during detachment.

It is preferred if the bearing section has a screw thread and/or a linear guide. Both the screw thread and the linear guide allow the stop carrier and the locking element carrier to be guided in a direction transverse to a mounting axis or mounting plane of the connection arrangement. A screw thread further has the advantage that the stop carrier and the locking element carrier are fixed relative to each other along a range of relative movement; i.e., between the operative position and the detachment position of the stop, at any desired intermediate position without an actuating force having to be exerted for this purpose.

The stop may be formed by a stop surface of the stop carrier, or the stop is provided by a component separate from the stop carrier. Regardless of this, it is preferred if the stop carrier, the stop, and the locking element carrier are made from a rigid material, for example from plastic or metal, and if only the locking element is made from an elastically deformable material, in particular from an elastomer.

In a preferred embodiment, the first assembly has a spring that acts on the stop carrier and/or on the locking element carrier so that the stop is urged into the operative position. This makes it possible to define a preferred relative position between the stop carrier and the locking element carrier, the spring having the additional advantage of contributing to the holding forces of the locking element in the mounted state of the connection arrangement. Nevertheless, in order to detach the two assemblies, only the force exerted by the spring needs to be overcome to allow the stop to assume its detachment position, which in turn allows the locking element to deform into its detachment condition unhindered by the stop.

A preferred embodiment provides that the first assembly have an actuating device by which the stop can be transferred to the detachment position and preferably fixed in the detachment position. The actuating device allows the stop to be transferred to the detachment position in a controlled manner and independently of the orientation of the connection arrangement relative to gravity. This transfer preferably takes place in a direction parallel to the mounting axis or mounting plane of the connection arrangement. Moreover, the actuating device allows the stop to be fixed in the detachment position.

Advantageously, the actuating device includes a thrust bolt or threaded bolt and/or a thrust sleeve or threaded sleeve. A thrust bolt and a thrust sleeve have the advantage of particularly easy manipulation, an actuating force being produced by a pressure force exerted on the bolt or sleeve. A threaded bolt and a threaded sleeve have the advantage of fixing a relative position between the stop and the locking element also in intermediate positions.

In order to further simplify the handling of the connection arrangement, it is proposed that the stop carrier and/or the locking element carrier have at least one manipulation surface and/or at least one tool engagement surface.

A manipulation surface may be, for example, a knurled surface which enables the stop carrier and/or the locking element carrier to be easily manipulated, in particular rotated, by hand. A tool engagement surface is preferably an engagement surface for a wrench or a screwdriver.

Furthermore, it is preferred if the second assembly has an engagement surface for engagement against the stop carrier or for engagement against the locking element carrier. This provides a simple way of defining the position of the stop carrier or of the locking element carrier in the mounted state of the connection arrangement, which in turn makes it easier to define the relative position between the stop carrier and the locking element carrier.

It is possible that the arforementioned engagement surface may be an integral, non-movable part of the second assembly. However, it is also possible that the engagement surface may be movably disposed on the second assembly, in particular for purposes of compensating for a mounting clearance between the two assemblies.

It is particularly preferred if the stop carrier or the locking element carrier is disposed on a tubular member or provided by a tubular member. This allows for easy disposition of an in particular annular locking element and/or an in particular annular stop extending in the circumferential direction around a mounting axis of the connection arrangement.

Furthermore, it is preferred if one of the two assemblies has at least one connector stub. This connector stub can be easily connected to the other of the two assemblies, in particular by mounting (and detaching) the connector stub only from the outside with respect to an exterior of the other assembly, without an access being performed or required in the region of an inner side of the other assembly.

A connector stub may preferably also form a cable passage, for which the aforementioned possibility of mounting (and detachment) from one side is also preferred.

In particular, one of the two assemblies has a container, such as a fluid container or a switchgear cabinet, having at least one opening for receiving a connector stub, or has a coupling having at least one opening for receiving a connector stub.

It is particularly preferred if the connector stub has a fluid conduit so that fluid can be introduced into or drained from the aforementioned container or, for example, into or from the aforementioned coupling through the connector stub.

The fluid conduit preferably extends along a mounting axis of the connection arrangement. Thus, fluid can be introduced from the connector stub, for example, into the container or, for example, into the coupling, a fluid conduit axis correlating with the mounting axis of the connection arrangement, which contributes to the intuitive mounting and detachment of the connection arrangement.

It is possible that the first assembly and the second assembly may be sealed with respect to each other by a sealing element. Such a sealing element may be provided separately or may be formed by the locking element.

In another preferred embodiment, the first assembly has a counter-support for engagement against the second assembly, the counter-support being movably disposed on the first assembly. This is preferred in particular when in the mounted state of the connection arrangement, both a locking element carrier and a stop carrier are spaced apart from components of the second assembly. In order for the counter-support to be movably disposed on the first assembly, a bearing section having a screw thread and/or a linear guide may be provided.

Also, for purposes of manipulation of the counter-support, it is preferred if the counter-support has at least one manipulation surface (e.g., a gripping surface) and/or at least one tool engagement surface (in particular for a wrench or a screw driver).

It is possible that the stop, when in its operative position, bears against a supporting surface of the first assembly, which supporting surface is adjacent the locking element, and/or against a portion of the locking element (itself). The use of a supporting surface has the advantage that the reaching of the operative position can be haptically perceived particularly well, especially if the stop and the supporting surface are made from rigid materials. The engagement of the stop against a portion of the locking element has the advantage that particularly high holding forces can be produced, which holding forces are in particular continuously variable.

A preferred fundamental principle of the connection arrangement provides that during mounting of the two assemblies, the locking element deforms from an undeformed rest state of the locking element into the mounting condition, that when the stop is in the detachment position, the locking element is deformable from the undeformed rest state into the detachment condition, and that the mounting condition and the detachment condition are associated with deformations of the locking element in opposite directions relative to the undeformed rest state.

Advantageous embodiments are set forth in the dependent claims and in the following description of preferred embodiments.

An embodiment of a connection arrangement is designated in its entirety by reference numeral 10 in the drawing. This connection arrangement includes a first assembly 12 and a second assembly 14. Assemblies 12 and 14 can be joined together (see FIGS. 1 through 5) and detached from each other (see FIGS. 6 through 9) along a straight mounting axis 16.

First assembly 12 is configured as a connector stub 20. Second assembly 14 is configured as a container 22. Container 22 has a container wall 24 in which is formed a peripherally closed opening 26 for receiving connector stub 20 (see FIGS. 1 and 2).

First assembly 12 has a tubular member 28 which bounds a fluid conduit 30 extending along mounting axis 16 of connection arrangement 10.

Tubular member 28 and fluid conduit 30 extend between an insertion end 32 for inserting connector stub 20 into opening 26 of container 22 and a distal end 34, which serves, for example, for connection of a pipe or hose.

Tubular member 28 has an annular stop carrier 36 having a stop 38 (see also FIGS. 2 and 7) which is formed by an annular surface extending in a plane perpendicular to mounting axis 16. Stop 38 faces toward the distal end 34 of tubular member 28.

Disposed adjacent the stop carrier 36 is an annular locking element carrier 40 on which is disposed an annular, in particular annular-disk-shaped locking element 42. Locking element 42 is made from an elastomeric material.

Locking element carrier 40 is threadedly and movably connected to tubular member 28 via a bearing section 44 in the form of a screw thread 46.

First assembly 12 further includes a counter-support 48, which is also annular in shape and threadedly supported on tubular member 28 on a second bearing section 50 in the form of a screw thread 52. The counter-support has a pressure-applying surface 54 facing the locking element 42.

Locking element 42 has portion 56 extending radially outward from locking element carrier 40. A radially inner portion 58 of locking element 42 is fixed to locking element carrier 40.

To allow for manipulation and relative movement of stop carrier 36, locking element 42, and of counter-support 48, first assembly 12 includes at least a subset of the tool engagement surfaces mentioned below: Tubular member 28 has a first tool engagement surface 60, which is associated with stop carrier 36. Locking element carrier 40 has a second tool engagement surface 62, which is associated with locking element carrier 40 and locking element 42. Counter-support 48 has a third tool engagement surface 64, which is provided as an alternative, or in addition, to a gripping or manipulation surface 66 provided in the form of, for example, a knurled surface.

Figure 2:
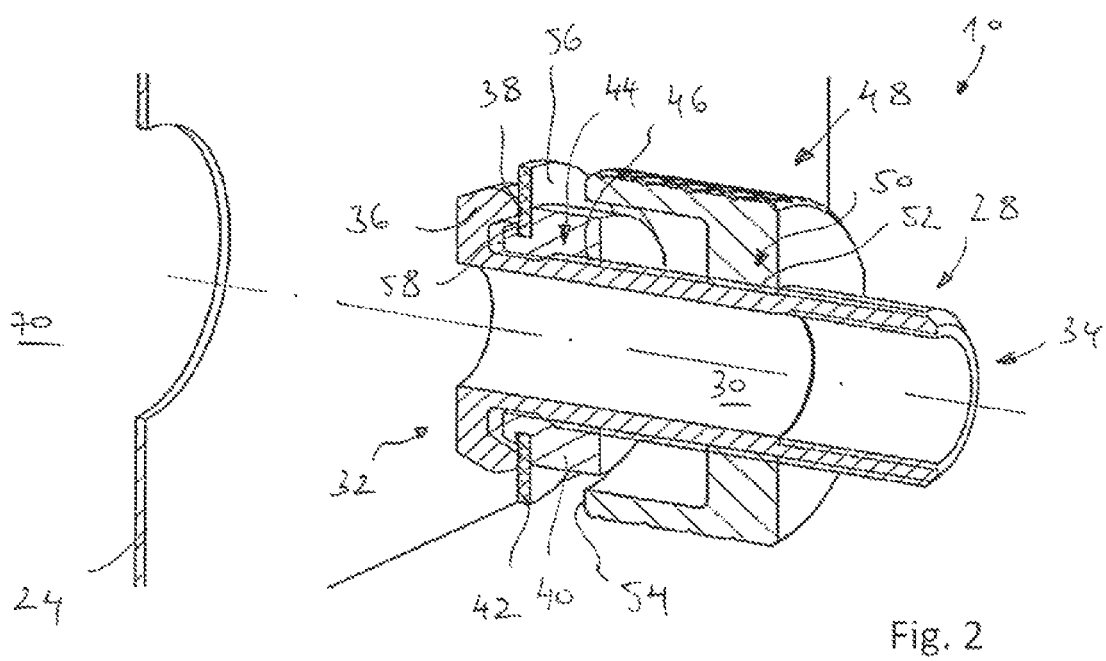
FIG. 2 is a perspective sectional view showing the connection arrangement of FIG. 1 in the initial state prior to the mounting of the connection arrangement.

In an initial state prior to the mounting of connection arrangement 10, assemblies 12 and 14 are spaced apart and aligned relative to each other along mounting axis 16 (see FIGS. 1 and 2). In this initial state, it is preferred that stop 38 assume an operative position in which stop 38 bears against locking element 42, in particular against portion 58 of locking element 42. This state can be brought about by threading stop carrier 36 and locking element carrier 40 relative to each other until stop 38 engages with locking element 42, in particular with portion 58 of locking element 42.

Figure 3:
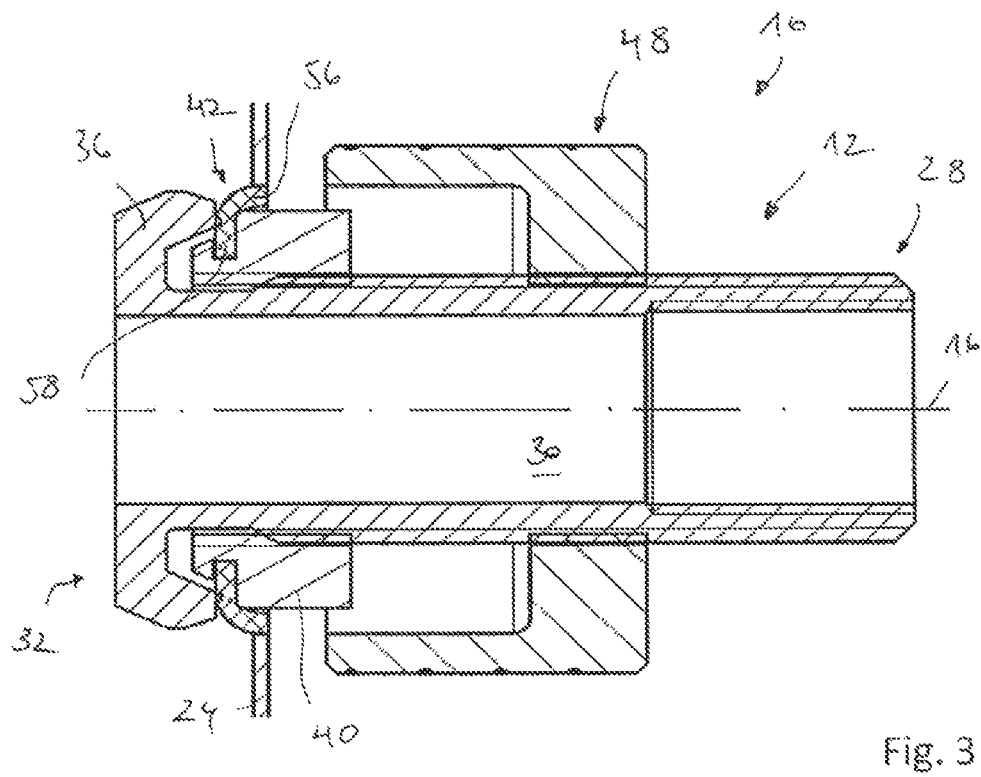
FIG. 3 is a sectional side view showing the connection arrangement of FIG. 1 during a first mounting phase.

In a preferred initial state, counter-support 48; i.e., its pressure-applying surface 54, is spaced from portion 56 of locking element 42 by a sufficient distance to allow locking element 42 to deform, unhindered by counter-support 48, into a mounting condition in the course of a first mounting phase (see FIG. 3). During a first mounting phase, insertion end 32 of tubular member 28 is inserted into opening 26 of container wall 24, the opening 26 being sized such that it is smaller than portion 56 of locking element 42 when locking element 42 is in an undeformed initial state. During insertion of insertion end 32 into opening 26, portion 56 of locking element 42 engages with the outer side of container wall 24 in the region of the edge of opening 26 and is deformed into a mounting condition (see FIG. 3), the locking element carrier 40 also being received within opening 26.

Figure 4:
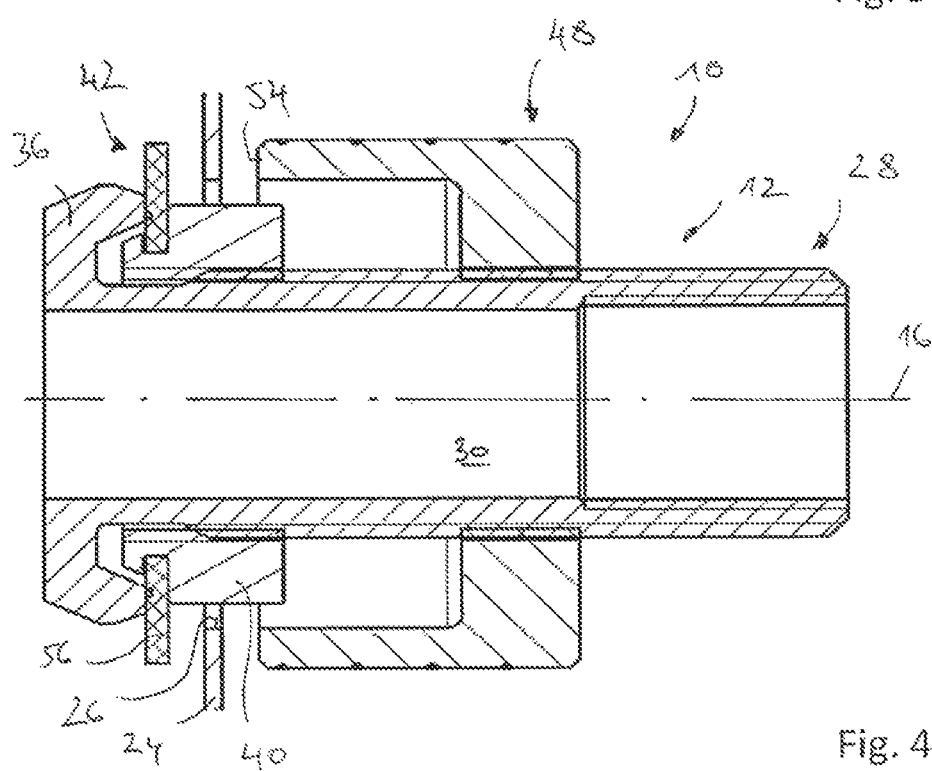
FIG. 4 is a sectional side view showing the connection arrangement of FIG. 1 during a second mounting phase.

Inserting locking element 42 further into opening 26 causes locking element 42 to move out of engagement with opening 26 of container wall 24 and to elastically deform back into a substantially undeformed rest state (see FIG. 4). In this mounting phase, locking element 42 and pressure-applying surface 54 of counter-support 48 are disposed on opposite sides of container wall 24, but initially still spaced apart from container wall 24.

Actuation of counter-support 48 (see FIG. 5) causes locking element 42 and pressure-applying surface 54 of counter-support 48 to engage with opposite sides of container wall 24. To this end, counter-support 48 is threaded relative to tubular member 28 by means of screw thread 52 in such a manner that counter-support 48 is moved further toward locking element 42.

Thus, the mounted state of connection arrangement 10 is reached. In this state, locking element carrier 40 is disposed at the level of opening 26 of container wall 24, and furthermore is received in a hollow-cylindrical space 68 of counter-support 48. Locking element 42 sealingly bears against stop 38 and against an inner side of container wall 24, and thus also provides a seal between first assembly 12 and second assembly 14, the seal preventing escape of fluid from an interior space 70 of container 22 into an ambient environment of the connection arrangement, identified in FIG. 5 by reference numeral 71.

Figure 5:
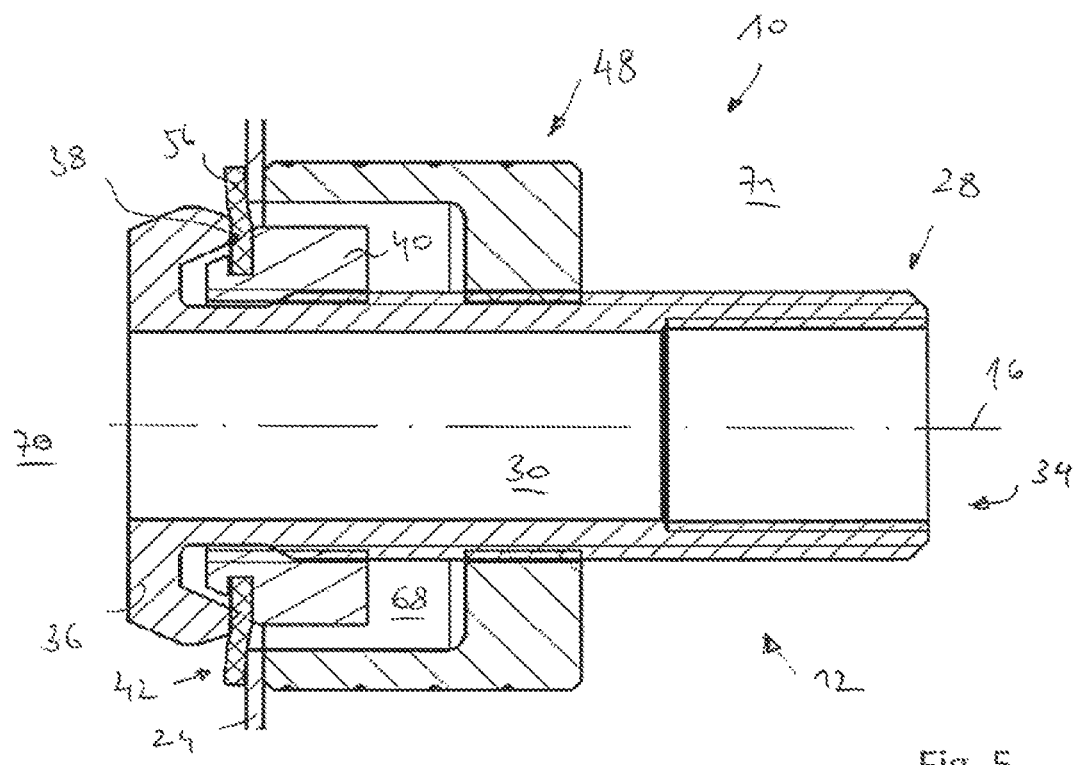
FIG. 5 is a sectional side view showing the connection arrangement of FIG. 1 in a mounted state.
Figure 6:
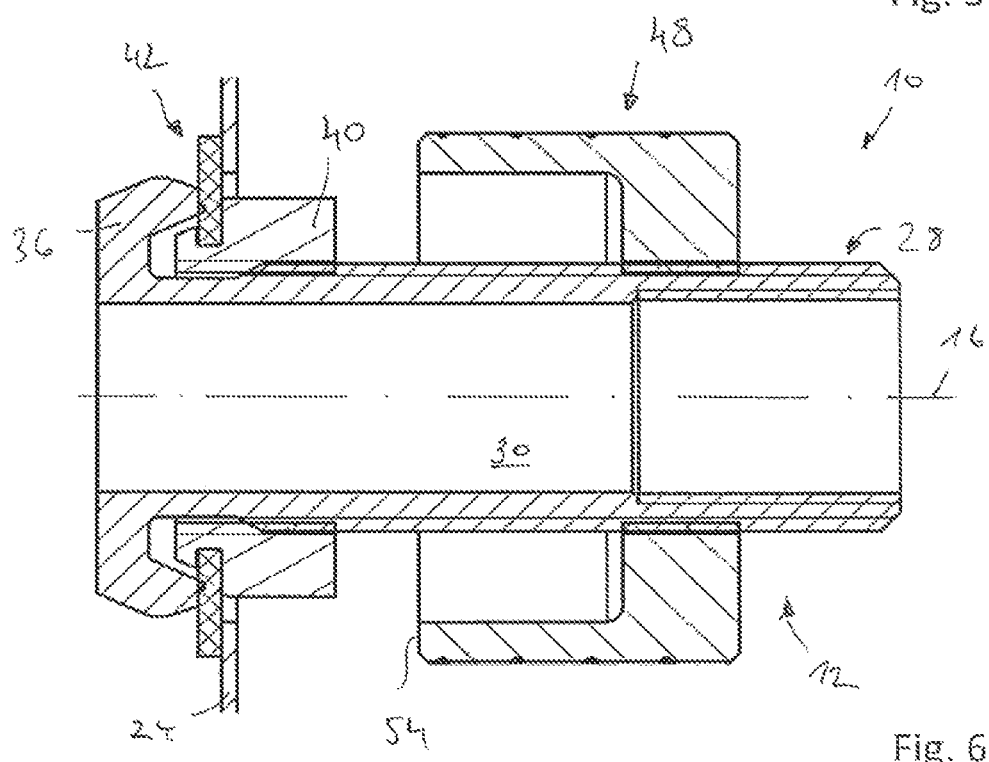
FIG. 6 is a sectional side view showing the connection arrangement of FIG. 1 in a first detachment phase.

In order to detach connection arrangement 10, first, counter-support 48 is threaded relative to tubular member 28 in such a way that pressure-applying surface 54 is spaced apart from container wall 24 (see FIG. 6). While first assembly 12 is movable relative to container wall 24 already in this detached state, complete removal/withdrawal of first assembly 12 from container 22 would be associated with a very substantial deformation of locking element 42 or possibly even damage thereto. This is the reason why very high holding forces are exerted by locking element 42 when the connection arrangement is in the mounted state (see FIG. 5).

Figure 7:
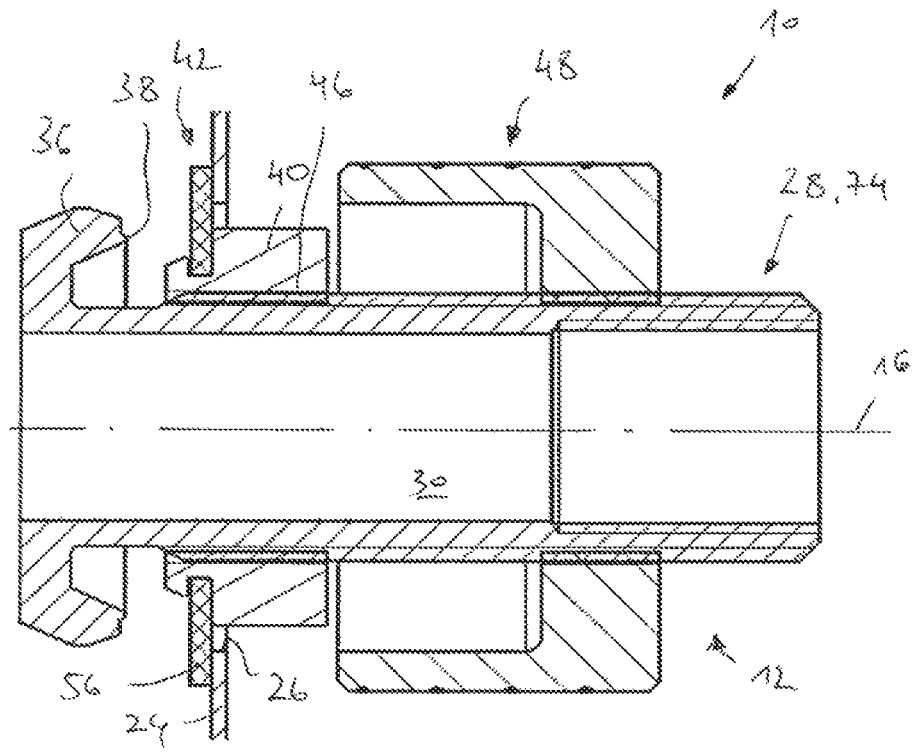
FIG. 7 is a sectional side view showing the connection arrangement of FIG. 1 in a second detachment phase.
Figure 8:
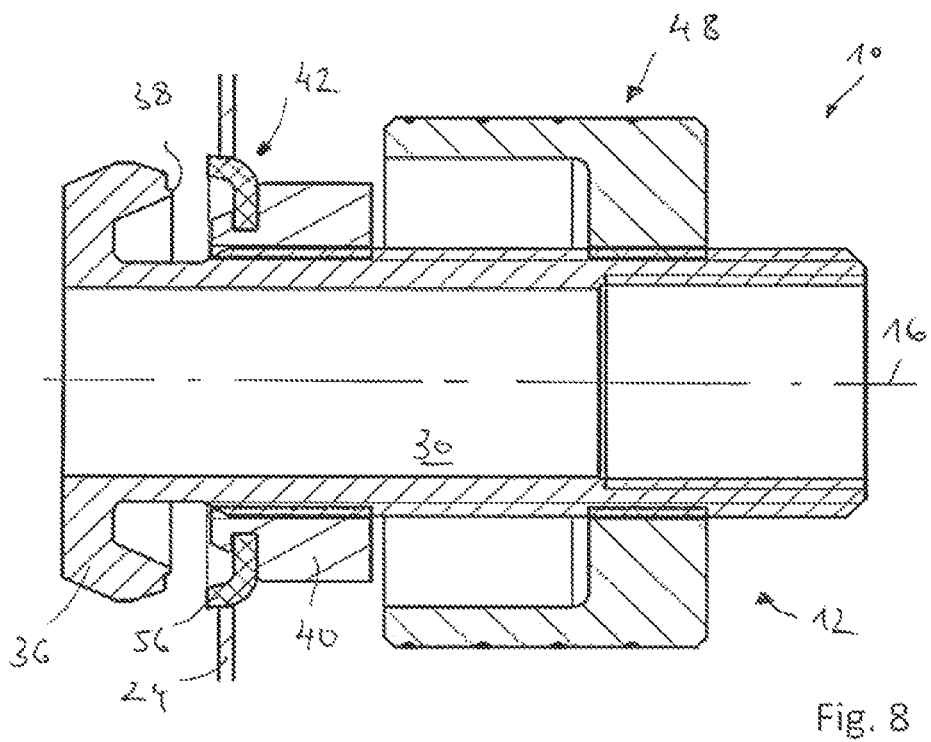
FIG. 8 is a sectional side view showing the connection arrangement of FIG. 1 in a third detachment phase.

In a subsequent mounting step (see FIG. 7), in order to allow assembly 12 to be detached with low detachment forces, stop 38 and locking element 42, or, respectively, stop carrier 38 and locking element carrier 40, are moved relative to each other in such a way that stop 38 assumes a detachment position spaced further apart relative to the aforedescribed operative position, in which detachment position stop 38 is spaced from portion 56 of locking element 42 by a sufficient distance to allow locking element 42 to deform into a detachment condition unhindered by stop 38, which detachment condition is assumed by locking element 42 under deformation of its portion 56 when locking element 42 is urged through opening 26 of container wall 24 during detachment of first assembly 12 (see FIG. 8).

Figure 9A:
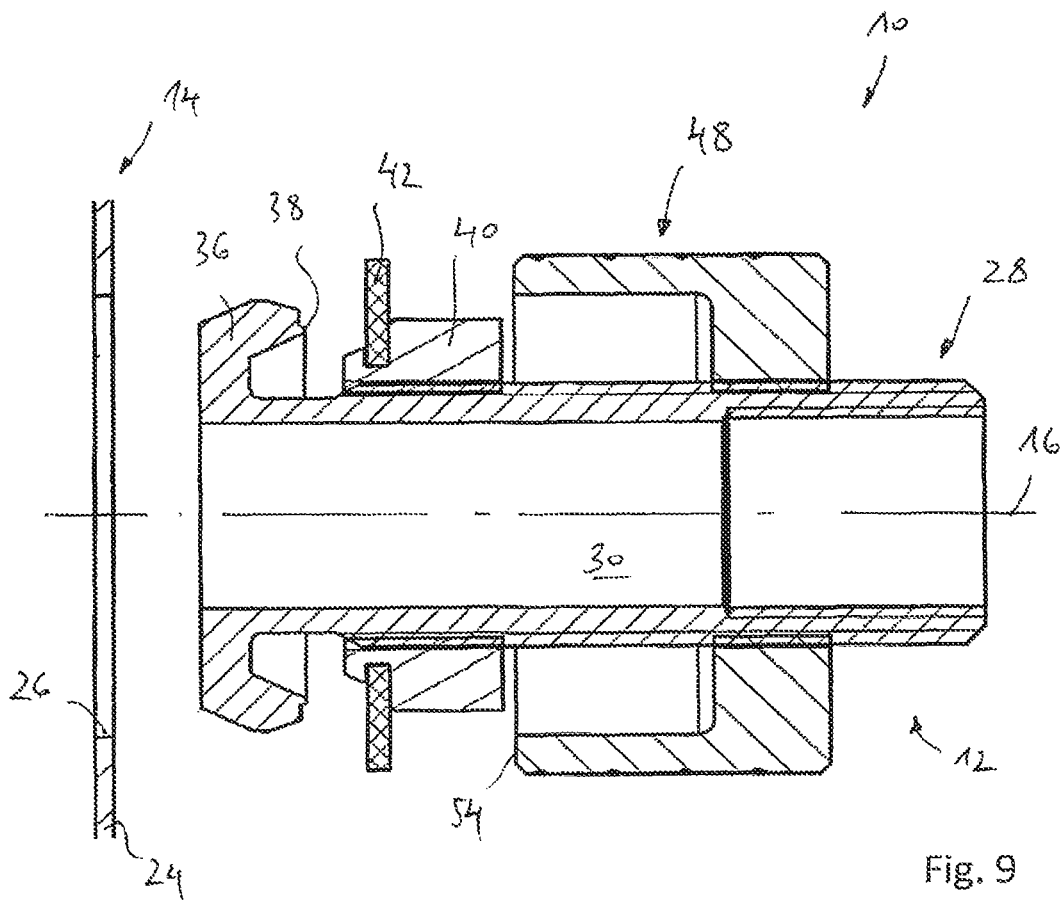
FIG. 9a is a side view corresponding to FIG. 5 showing a further embodiment of a connection arrangement.
Figure 9A:
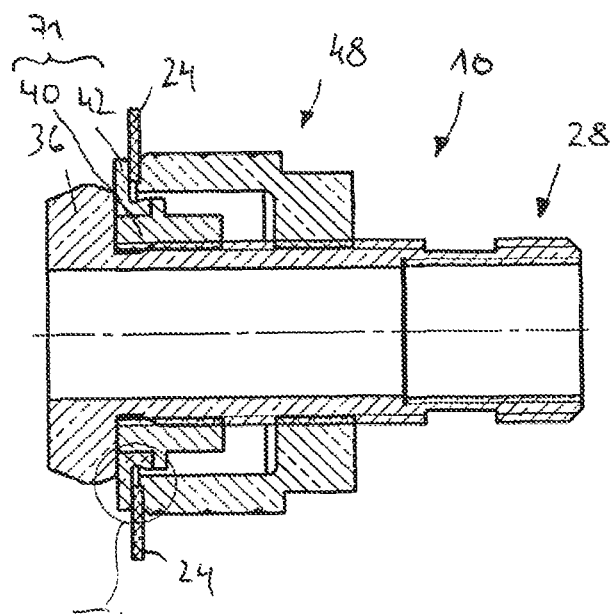

Once the locking element 42 has completely passed through opening 12 as the first assembly 12 is withdrawn, locking element 42 deforms back into its undeformed initial state (see FIG. 9). First assembly 12 is now separate from second assembly 14.

In order to remount the two assemblies 12 and 14, locking element carrier 40 and stop carrier 36 can be transferred back to a pre-mounting condition (see FIG. 2) by relative rotation about mounting axis 16.

All of the aforedescribed mounting and detachment operations are performed only by manipulating components of first assembly 12 in ambient environment 71 (see FIG. 5) of connection arrangement 10; i.e., on the outside of second assembly 14 and without accessing the interior space 70 of second assembly 14.

The connection arrangement 10 according to FIGS. 1 through 9 is used, in particular, to allow conveyance of fluid from distal end 34 of tubular member 28 of first assembly 12 through fluid conduit 30 into the interior space 70 of the container (see FIGS. 1, 2 and 5).

Figure 9B:
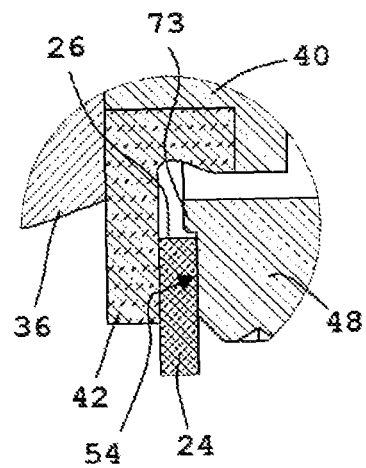

A connection arrangement 10 shown in FIGS. 9a and 9b has two specific features which go beyond the aforedescribed connection arrangement 10 and each of which is advantageous by itself:

Locking element 42 and locking element carrier 40 are connected together by a material-to-material bond and are preferably manufactured as a two-component assembly 71 in a two-component injection-molding process.

Adjacent the pressure-applying surface 54, counter-support 48 has an annular or segmented projection 73 which performs a centering function by engaging in opening 26 of container wall 24 during mounting of the assemblies 12 and 14.

A fundamental principle of the connection arrangements 10 according to FIGS. 1 through 9b is that locking element 42 assumes an undeformed state when assemblies 12 and 14 are in the detached state, that locking element 42 is deformed into a mounting condition during the mounting process (see FIG. 4), that locking element 42 is deformed into a detachment condition during the detachment process (see FIG. 8). When viewed relative to the rest position, the mounting condition (see FIG. 3) and the detachment condition (see FIG. 8) of locking element 42 are associated with deformations of locking element 42 in opposite directions relative to the undeformed rest state.

Another fundamental principle of the connection arrangements 10 is that when the mounting of the connection arrangements 10 is completed; i.e., when the connection arrangements 10 are in the mounted state, locking element 42 forms an undercut which counteracts detachment of the two assemblies 12, 14 (see FIGS. 4, 5, and 9a) (in this case, the container wall 24 adjacent the opening 26 is disposed at the level of the portion 56 of locking element 42 in the mentioned undercut).

The fundamental principles explained above are also implemented in the exemplary embodiments described below. In the following description of the exemplary embodiments according to FIGS. 11 through 30, reference is also made to the above description of the exemplary embodiments according to FIGS. 1 through 9b. In order to avoid repetitions, the description will mainly focus on features which are specific to the respective exemplary embodiments and which have not yet been described earlier with reference to the exemplary embodiments according to FIGS. 1 through 9b. Components which are identical or functionally equivalent to those already described carry the same reference numerals.

The connection arrangement 10 according to FIGS. 10 through 13 includes a second assembly 14 which is configured, for example, as a container 22 and has a container wall 24 bounding an interior space 70. Disposed in container wall 24 is an opening 26 which serves to allow the insertion end 32 of a first assembly 12 to be mounted and detached along a mounting axis 16.

Second assembly 14 has on its outside an engagement surface 72 which preferably extends perpendicular to mounting axis 16.

First assembly 12 includes an actuating device which is designated in its entirety by reference numeral 74 and has a thrust bolt 76, an end of which is connected to a stop carrier 36, for example via a screw thread 78. Stop carrier 36 has a stop 38 extending in an annular plane (see FIG. 12).

Figure 10:
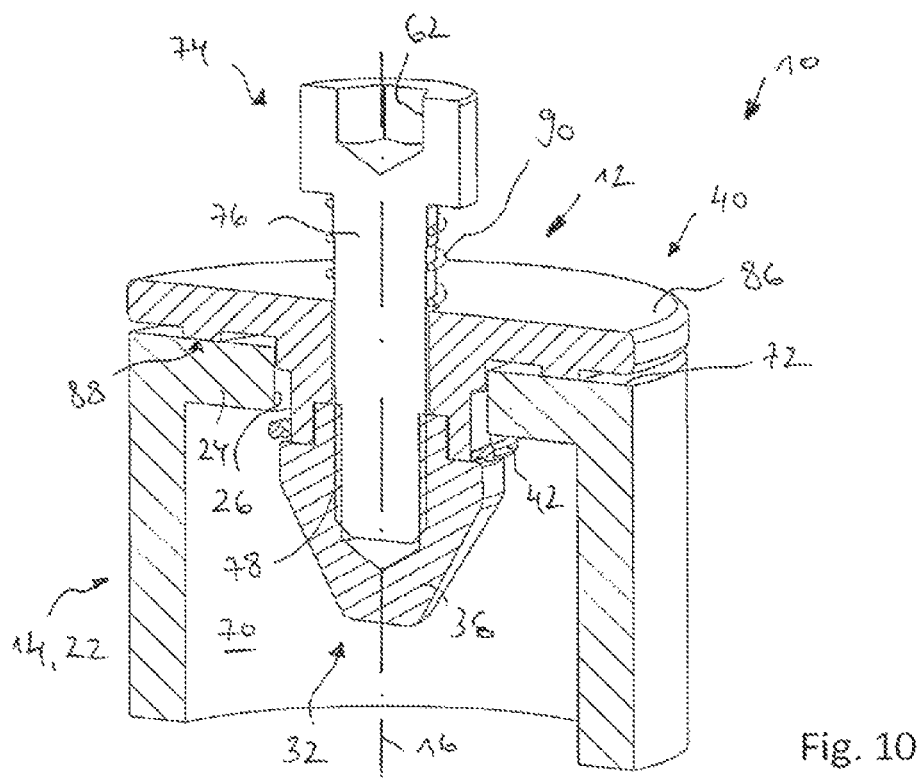
FIG. 10 is a perspective sectional view of another embodiment of a connection arrangement, which has an actuating device in the form of a thrust bolt, shown in a mounted state.
Figure 11:
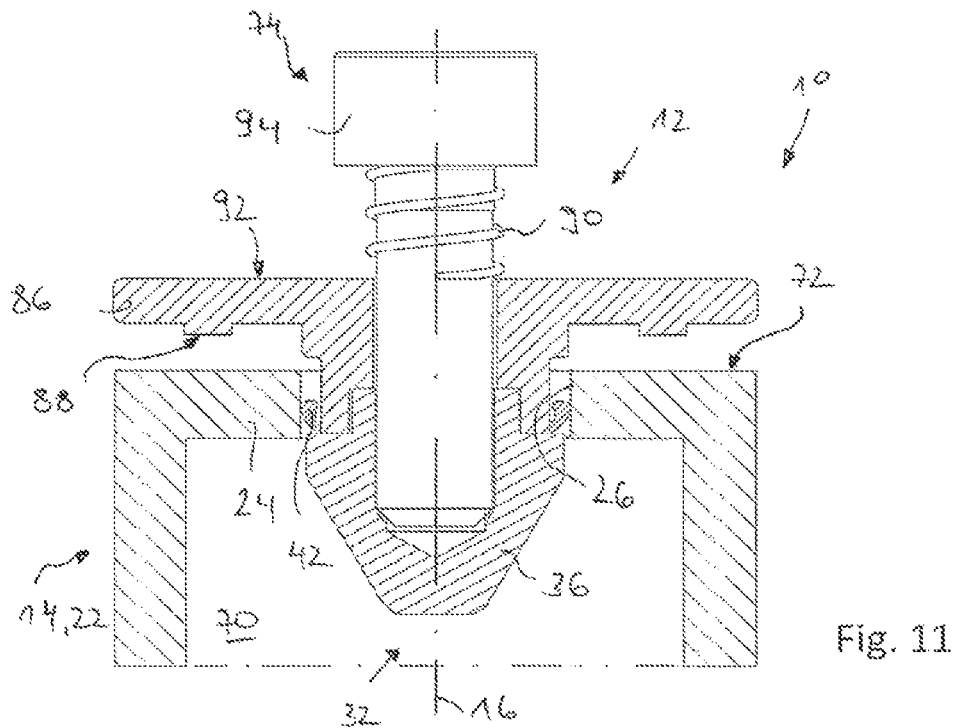
FIG. 11 is a sectional side view showing the connection arrangement of FIG. 10 during a mounting phase.

First assembly 12 further includes a locking element carrier 40 having a supporting surface 80 at an end facing the stop carrier 36 (see FIG. 12), the supporting surface 80 bearing against stop 38 when stop 38 is in the operative position (see FIG. 10).

In a bearing section 44 having a linear guide 81, stop carrier 36 and locking element carrier 40 are movable relative to each other in a direction parallel to mounting axis 16. Linear guide 81 may have a receptacle 82 for guiding an, in particular cylindrical, portion 84 into the receptacle 82 (see FIG. 12).

Figure 12:
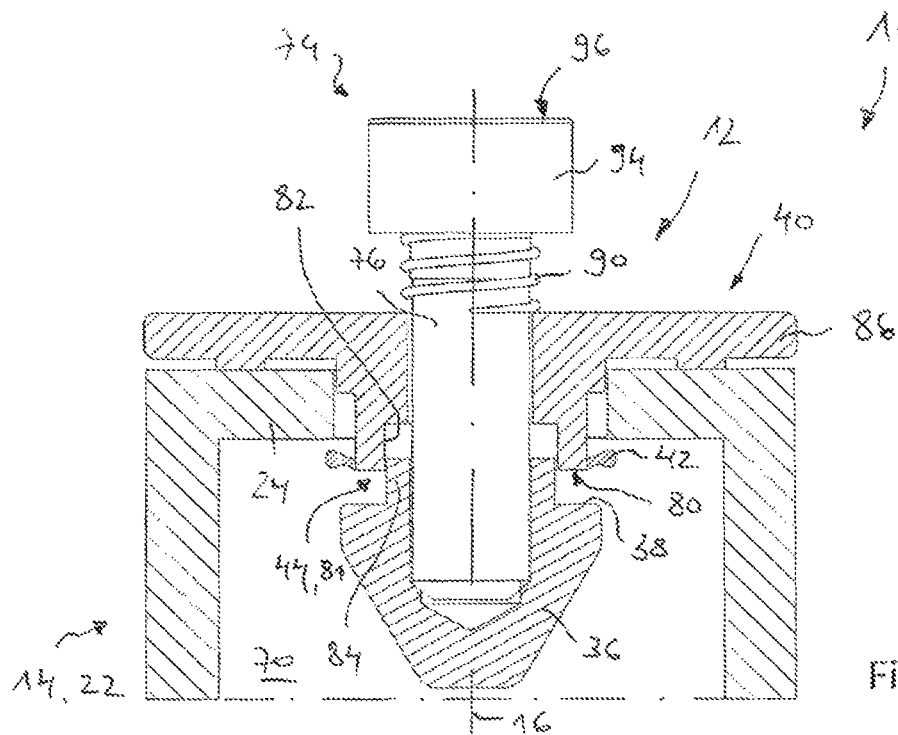
FIG. 12 is a sectional side view showing the connection arrangement of FIG. 10 during a first detachment phase.
Figure 13:
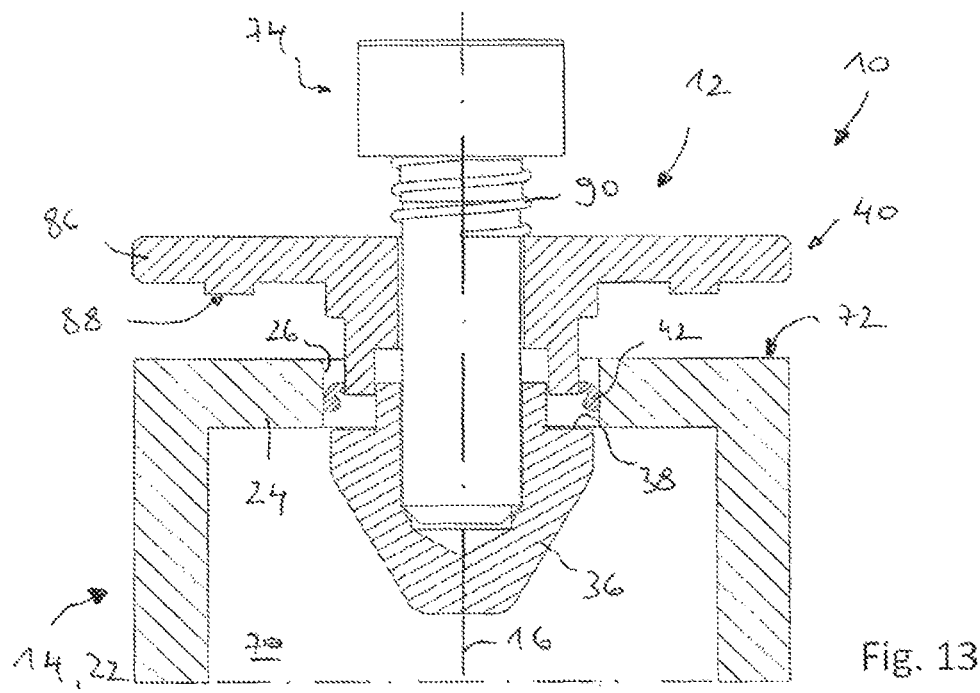
FIG. 13 is a sectional side view showing the connection arrangement of FIG. 10 during a second detachment phase.

At its end facing away from stop carrier 36, locking element carrier 40 has a collar 86 having an engagement portion 88 which faces second assembly 14 (see FIG. 11) and which can be brought into engagement with engagement surface 72 of second assembly 14 (see FIGS. 13 and 12).

First assembly 12 further includes a spring 90 in the form of a compression spring that bears at one end against an end face 92 of collar 86 and at the other end against a head 94 of thrust bolt 76. When connection arrangement 10 is in the mounted state (see FIG. 10), collar 86 of locking element carrier 40 bears with engagement portion 88 against engagement surface 72 of second assembly 14. Spring 90 bears at one end against end face 92 of collar 86 and pushes head 94, and thus thrust bolt 76, outwardly relative to interior space 70 along mounting axis 16. In this way, stop carrier 36 is urged with its stop 38 into its operative position, in which stop 38 bears against supporting surface 80 of locking element carrier 40. Locking element 42 forms an undercut for a portion of container wall 24 adjacent the opening 26.

In order to mount the connection arrangement 10 according to FIG. 10, first assembly 12 is moved from an initial state, in which first assembly 12 is spaced apart from second assembly 14, along mounting axis 16 and inserted, with the insertion end 32 of stop carrier 36 first, into opening 26 of second assembly 14. During this process, locking element 42 is deformed into its mounting condition in the region of opening 26 (see FIG. 11). After locking element 42 has passed over the boundary of opening 26, it elastically deforms back (see FIG. 10). In this state, the disposition of stop 38 adjacent the locking element 42 prevents connection arrangement 10 from being detached; i.e., first assembly 12 from being withdrawn from of second assembly 14 along mounting axis 16.

In order to detach connection arrangement 10, it suffices to exert pressure on a manipulation surface 96 (e.g., by hand). Preferably, manipulation surface 96 is an end face of thrust bolt 76, in particular of head 94 of thrust bolt 76. The pressure mentioned may also be exerted using a tool which is inserted into a tool engagement surface 62 (e.g., a hexagon socket surface). In any case, the pressure exerted on actuating device 74 serves to push thrust bolt 76 further toward interior space 70 of second assembly 14 (see FIGS. 10 and 12) so that stop 38, under the compression of spring 90, is spaced apart from supporting surface 80 of locking element carrier 40 by a greater distance. This distance (see FIG. 12) serves to create a clearance that enables locking element 42 to be deformed into a detachment condition unhindered by stop 38 (see FIG. 13).

As an alternative to the thrust bolt 76 described with reference to FIGS. 10 through 13, actuating device 74 may also have a threaded bolt 96 (compare the embodiment of a connection arrangement 10 according to FIGS. 14 and 15). Threaded bolt 96 and stop carrier 36 of this connection arrangement 10 are threaded together by means of a screw thread 46.

In addition, stop carrier 36 and locking element carrier 40 are guided relative to each other by means of a linear guide 81, namely, in a direction parallel to mounting axis 16. Preferably, a portion 84 of stop carrier 36 and a receptacle 82 of locking element carrier 40 are movable relative to each other only along mounting axis 16, but interlockingly connected together when viewed in the direction of rotation about mounting axis 16, for example by portion 84 having an outer surface different from a cylindrical shape, for example teeth configured to be complementary to radially inwardly facing teeth of receptacle 82.

In order to mount the connection arrangement 10, first assembly 12 may be prepared in such a manner that stop 38 of stop carrier 36 is already in contact with a supporting surface 80 of locking element carrier 40 before an insertion end 32 is inserted into opening 26 of second assembly 14.

In order to detach the two assemblies 12 and 14, threaded bolt 96 is actuated by rotating threaded bolt 96, for example using a tool engagement surface 62 of head 94. The interlocking fit between portions 82 and 84 acting in the direction of rotation prevents rotation of stop carrier 36, so that threaded bolt 96 is rotated out of stop carrier 36, whereby stop 38 is brought into a detachment position spaced further apart from supporting surface 80. Thus, locking element 42 is deformable into a detachment condition in the manner described above, which detachment condition allows first assembly 12 to be detached from second assembly 14 with low detachment forces.

In the exemplary embodiment according to FIGS. 1 through 9, the tubular member 28 having the thread 46 constitutes a component of an actuating device 74 that is functionally equivalent to a threaded bolt 96 (see FIG. 7).

Figure 14:
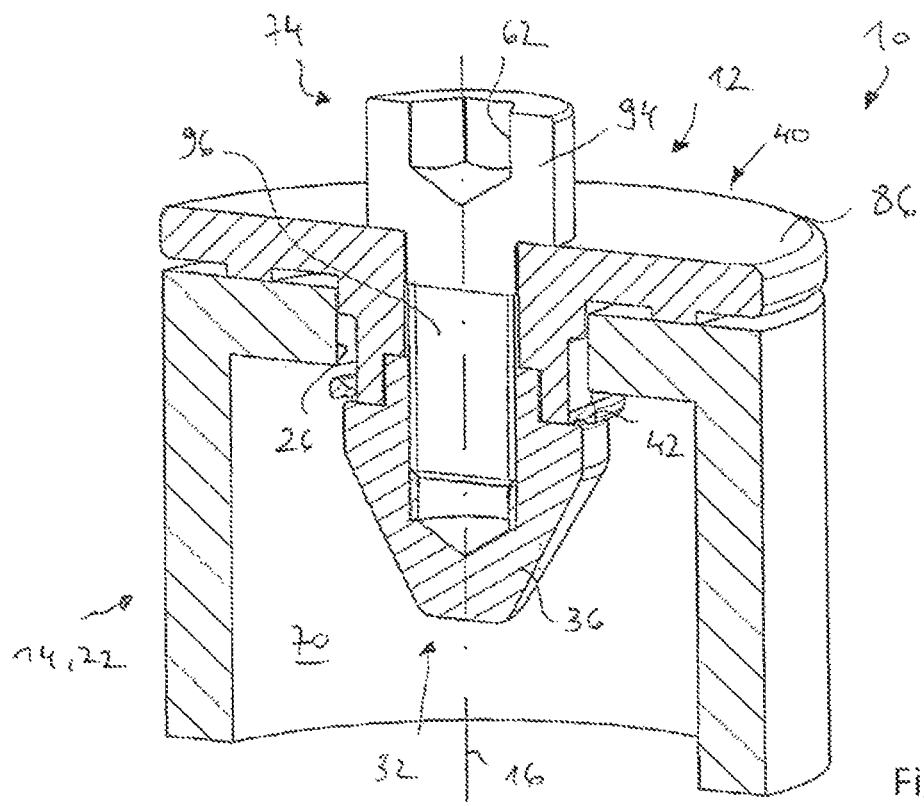
FIG. 14 is a perspective sectional view of another embodiment of a connection arrangement, which has an actuating device in the form of a threaded bolt.
Figure 15:
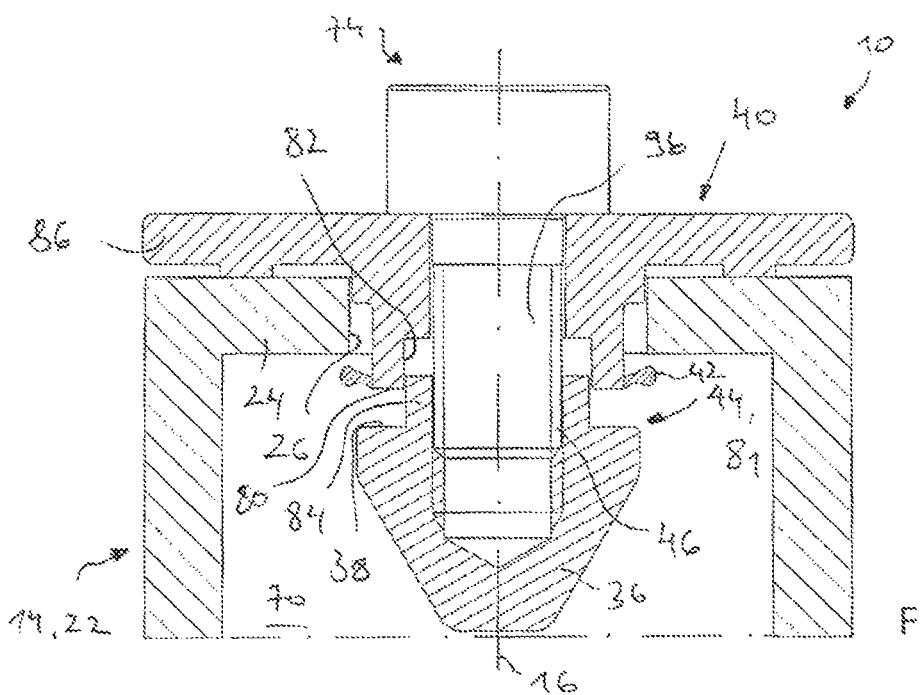
FIG. 15 is a sectional side view showing the connection arrangement of FIG. 14 during a first detachment phase.

In other respects, the design and operation of the connection arrangement 10 according to FIGS. 14 and 15 corresponds to the design and operation of the connection arrangement 10 according to FIGS. 10 through 13.

The connection arrangement 10 described below with reference to FIGS. 16 through 18, in turn, corresponds to the connection arrangement 10 according to FIGS. 14 and 15, except for the specific features described below. The connection arrangement 10 according to FIGS. 16 through 18 differs from the connection arrangement 10 according to FIGS. 14 and 15 by the configuration of bearing section 44 between stop carrier 36 and locking element carrier 40 and by the manner in which stop 38 cooperates with locking element 42.

Figure 17:
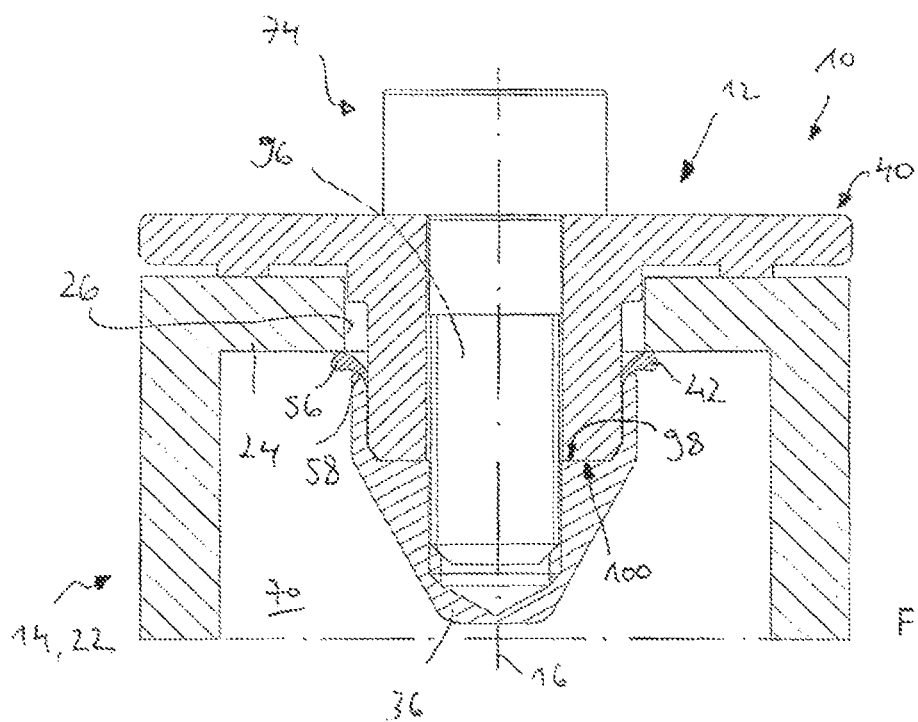
FIG. 17 is a sectional side view showing the connection arrangement of FIG. 16 in a completely mounted state.
Figure 18:
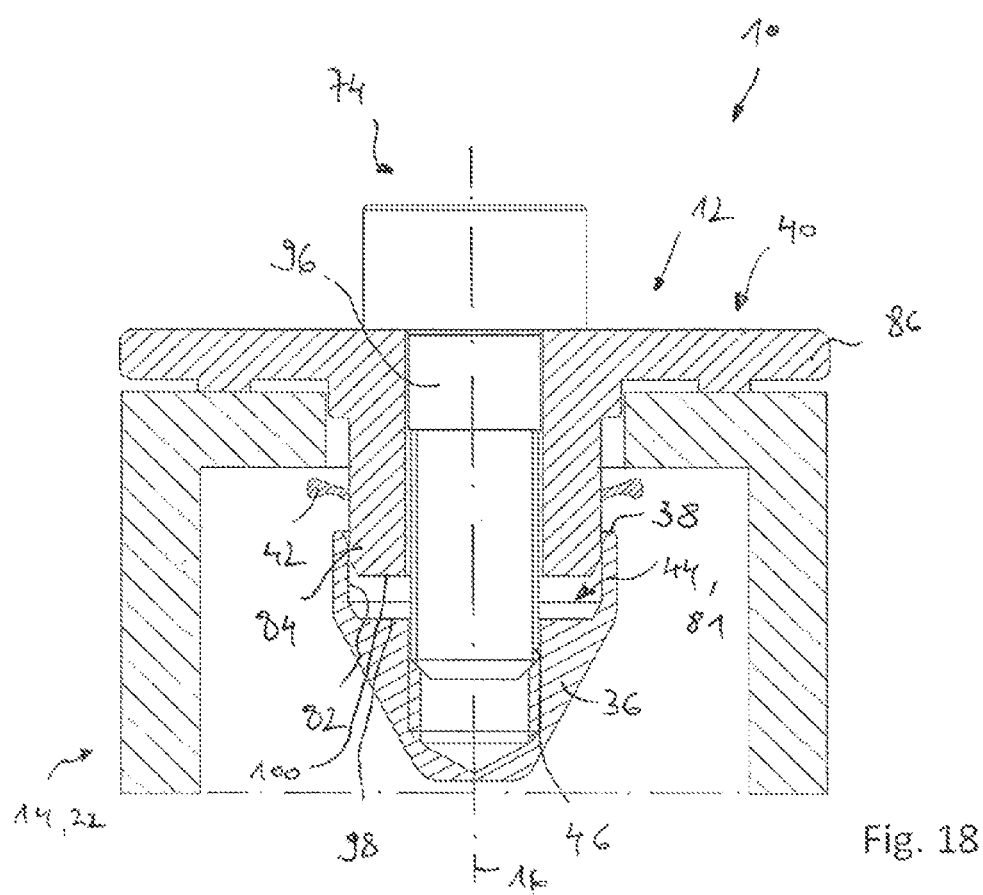
FIG. 18 is a sectional side view showing the connection arrangement of FIG. 16 during a detachment phase.

Bearing section 44 includes a linear guide 81 having a receptacle 82 which is disposed on stop carrier 36 and receives a portion 84 of locking element carrier 40 such that it is movable along mounting axis 16, but interlockingly fits therewith in the direction of rotation about mounting axis 16 (see FIG. 18). Stop 38 does not cooperate with a supporting surface 80 of locking element carrier 40, but directly with a radially inner annular portion 58 of locking element 42 (see FIG. 17).

A radially outer annular portion 56 of locking element 42 forms an undercut which prevents first assembly 12 from being detached from second assembly 14 (see FIG. 17).

When locking element 42 is in the operative position, it is possible that mutually facing reference surfaces 98 of stop carrier 36 and 100 of locking element carrier 40 bear against each other (see FIG. 17).

Figure 16:
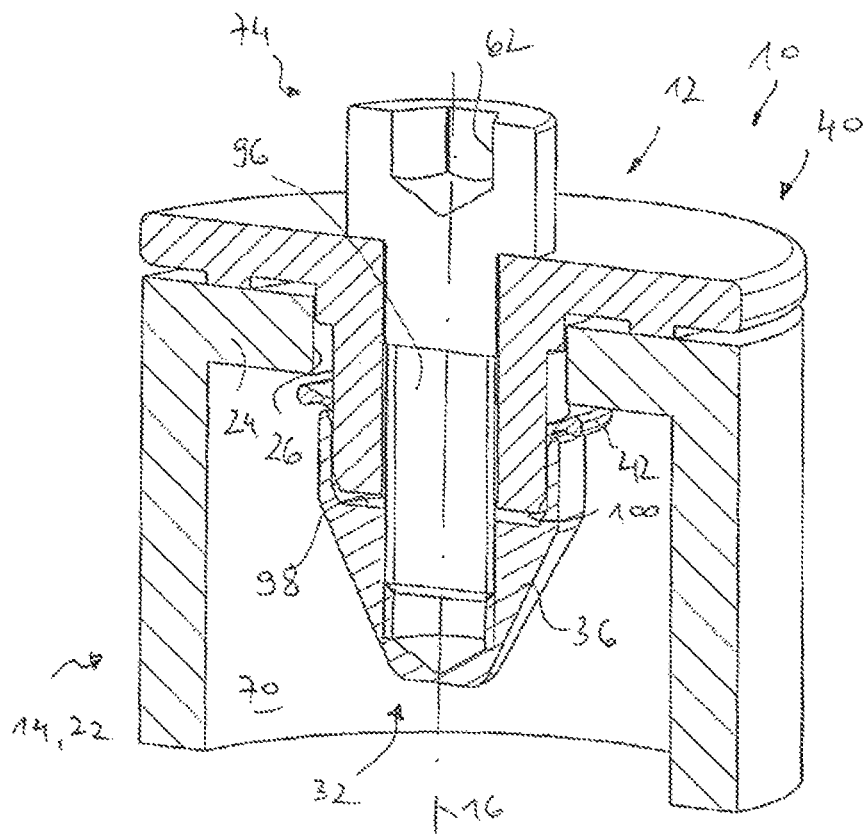
FIG. 16 is a perspective sectional view of another embodiment of a connection arrangement whose stop, when in its operative position, bears against a locking element, the connection arrangement being shown in a pre-mounted state.

In order to mount the connection arrangement 10 according to FIGS. 16 through 18, insertion end 32 of first assembly 12 is inserted into opening 26 of second assembly 14, it being preferred that reference surfaces 98 and 100 initially still be spaced apart from each other (see FIG. 16). This allows locking element 42 to deform, unhindered by stop 38, from a mounting condition (analogously illustrated, for example, in FIG. 11) back into an at least substantially undeformed state (see FIG. 16).

Rotation of threaded bolt 96 causes stop carrier 36 to be moved relative to locking element carrier 40 along mounting axis 16 until stop 38 engages with portion 58 of locking element 42. As a result, portion 56 of locking element 42 is also moved and brought into engagement with a side of container wall 24 facing interior space 70. Once reference surfaces 98 and 100 bear against each other, the mounting process is complete.

Starting from the mounted state shown in FIG. 17, detachment of the two assemblies 12 and 14 is accomplished by rotating threaded bolt 96 in such a manner that stop carrier 36 is moved with its stop 38 away from locking element 42 so that a clearance is created which can be used in the detachment of first assembly 12 from second assembly 14 (see FIG. 13 for an analogous illustration).

Figure 19:
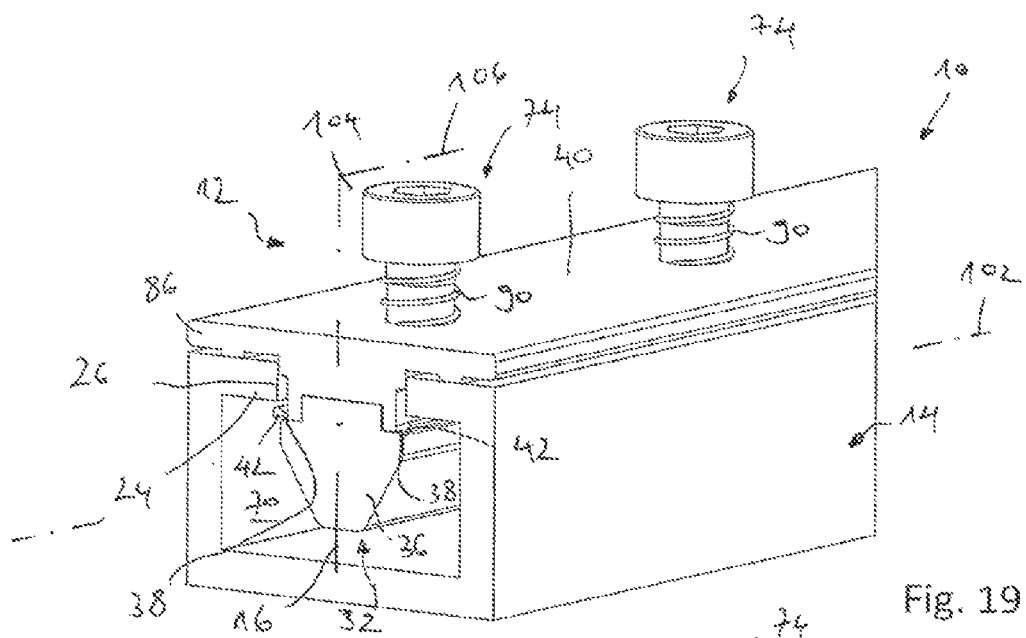
FIG. 19 is a perspective sectional view of another embodiment of a connection arrangement in the form of a linear arrangement, which corresponds to the connection arrangement according to FIGS. 10 through 13 in terms of design and functioning.
Figure 20:
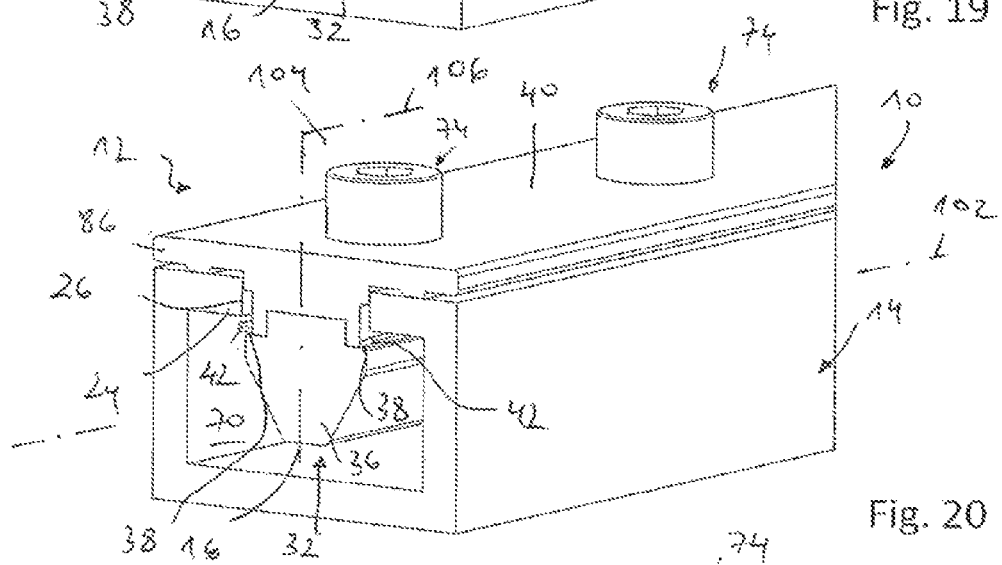
FIG. 20 is a perspective sectional view of another embodiment of a connection arrangement in the form of a linear arrangement, which corresponds to the connection arrangement according to FIGS. 14 and 15 in terms of design and functioning.
Figure 21:
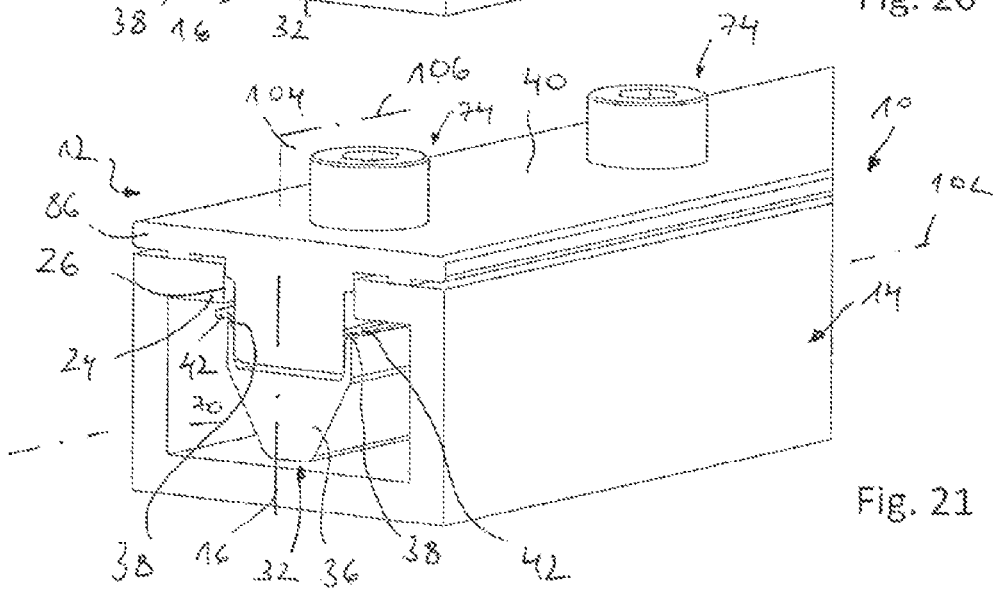
FIG. 21 is a perspective sectional view of another embodiment of a connection arrangement in the form of a linear arrangement, which corresponds to the connection arrangement of FIGS. 16 through 18 in terms of design and functioning.

The connection arrangements 10 shown in FIGS. 19 through 21 include first assemblies 12 and second assemblies 14 which, when mounted together, each form a linear arrangement extending along an axis of extension 102. Mounting axis 16 extends perpendicular thereto, the mounting axis 16 being part of a mounting plane 104 defined by mounting axis 16 and a vector 106 perpendicular thereto and extending parallel to axis of extension 102.

Preferably, at least a subset of the hereinafter mentioned components of first assembly 12 and second assembly 14 extends along axis of extension 102: stop carrier 36, stop 38, locking element carrier 40, locking element 42, container wall 24, opening 26.

Preferably, the at least one actuating device 74 is locally limited when viewed along axis of extension 102.

The connection arrangements 10 according to FIGS. 19 through 21 preferably have two separately provided locking elements 42 which are disposed on opposite sides of mounting plane 104 and which each extend along a straight line. These locking elements 42 each cooperate with a respective stop 38 which also extends parallel to axis of extension 102.

In other respects, the design and operation of the connection arrangement 10 according to FIGS. 19 through 21 corresponds to the design and operation of the connection arrangement 10 according to FIGS. 10 through 13 (in the case of FIG. 19), according to FIGS. 14 and 15 (in the case of FIG. 20), and according to FIGS. 16 through 18 (in the case of FIG. 21).

The connection arrangements 10 described above with reference to FIGS. 1 through 21 have in common that the respective first assembly 12 thereof has an insertion end 32 for insertion into an opening 26 of second assembly 14. In particular, the essential functions of the connection arrangement 10 are implemented in the first assembly 12, while for the second assembly 14, it is sufficient to provide an opening 26 (which may, for example, be peripherally closed, see FIGS. 1 through 18, or may, for example, be groove or slot-shaped, see FIGS. 19 through 21).

In contrast, in the exemplary embodiments described below with reference to FIGS. 22 through 30, second assembly 14 is configured as a connector stub 20 which is insertable with an insertion end 32 into an interior space 110 of a first assembly 12.

Figure 22:
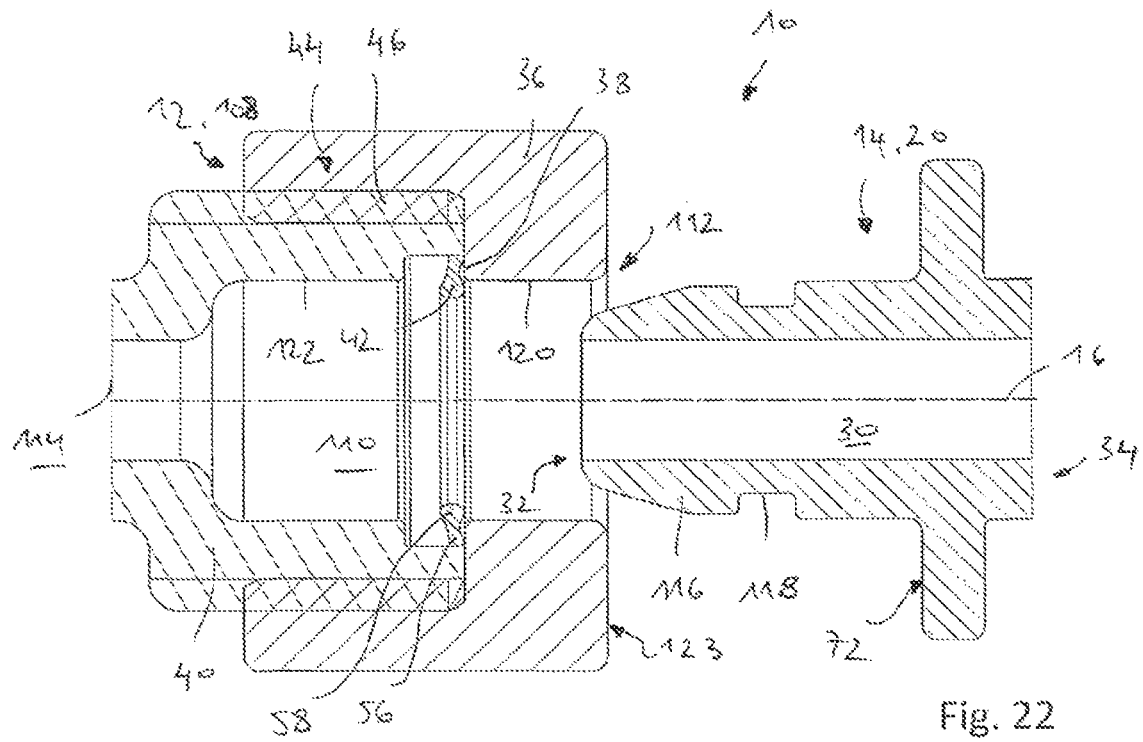
FIG. 22 is a sectional side view of another embodiment of a connection arrangement including a coupling and a connector stub, shown in an initial state prior to the mounting of the connection arrangement.

First assembly 12 is preferably provided in the form of a coupling 108 (see FIG. 22).

Second assembly 14 extends between insertion end 32 and a distal end 34 and preferably has a fluid conduit 30 extending parallel to mounting axis 16.

Interior space 110 of first assembly 12 extends to an opening 112 when viewed along mounting axis 16. It is possible that interior space 110 may also be open in a region of a portion or end 114 of first assembly 12 opposite the opening 112. When connection arrangement 10 is in the mounted state (see FIG. 24), fluid can be conveyed from distal end 34 of connector stub 20 of second assembly 14 through fluid conduit 30 into interior space 110 and to the end 114 of the first assembly. This end 114 of first assembly 12 and the distal end of second assembly 14 may be adjoined by pipes, hoses, or containers.

Connector stub 20 of second assembly 14 has an insertion head 116 which widens conically, starting at insertion end 32, and is adjoined by a radially inwardly recessed locking element receptacle 118. An engagement surface 72 is disposed between locking element receptacle 118 and distal end 34 when viewed along mounting axis 16, the engagement surface 72 extending transverse, in particular perpendicular, to mounting axis 16 and facing first assembly 12.

First assembly 12 includes an annular stop carrier 36 having a central, preferably hollow-cylindrical passage 120 which, at its end facing away from opening 112, is limited by an annular stop 38 extending perpendicular to mounting axis 16.

Stop carrier 36 is threadedly connected to a locking element carrier 40, namely, in a bearing section 44 having a screw thread 46.

Locking element carrier 40 has a radially inwardly facing, e.g., hollow-cylindrical, wall 122. An annular locking element 42 is attached to locking element carrier 40 in a portion of wall 122 adjacent the stop 38. More particularly, there is provided a radially outer annular portion 56 connected to locking element carrier 40 and a radially inner annular portion 58. The two portions 56 and 58 are integrally connected as one piece and together form an annular locking lip capable of deforming from an undeformed rest state (see FIG. 22) into a mounting condition (see FIG. 23) and into a detachment condition (see FIGS. 26 and 27).

Figure 23:
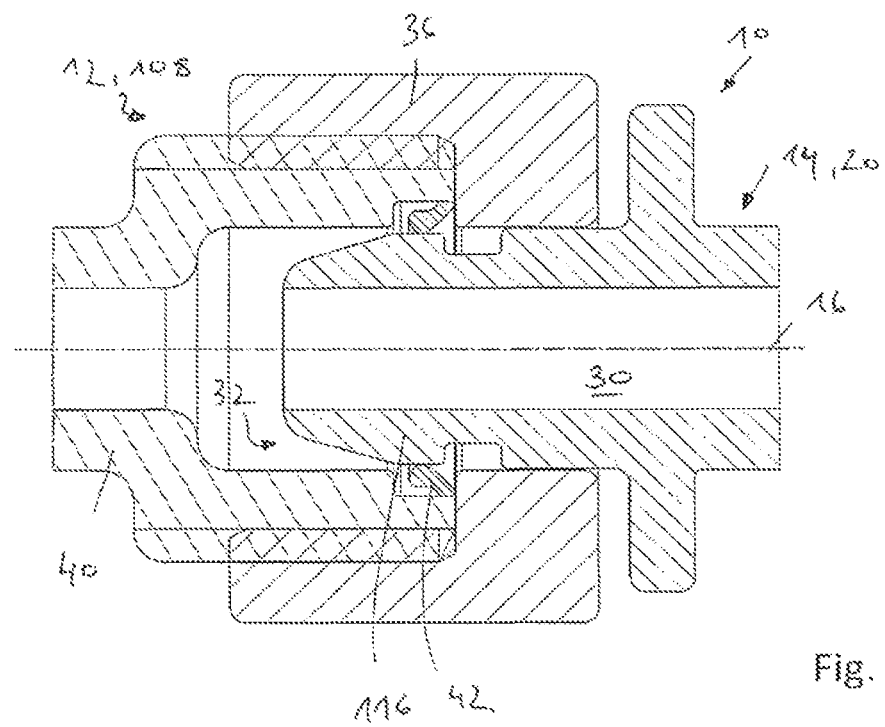
FIG. 23 is a view showing the connection arrangement of FIG. 22 during a mounting phase.

In order to mount the connection arrangement 10 according to FIGS. 22 through 27, insertion head 116 is inserted, with insertion end 32 first, into opening 112 of stop carrier 36 until insertion head 116 engages with portion 58 of locking element 42 and deforms locking element 42 into the mounting condition (see FIG. 23).

Figure 24:
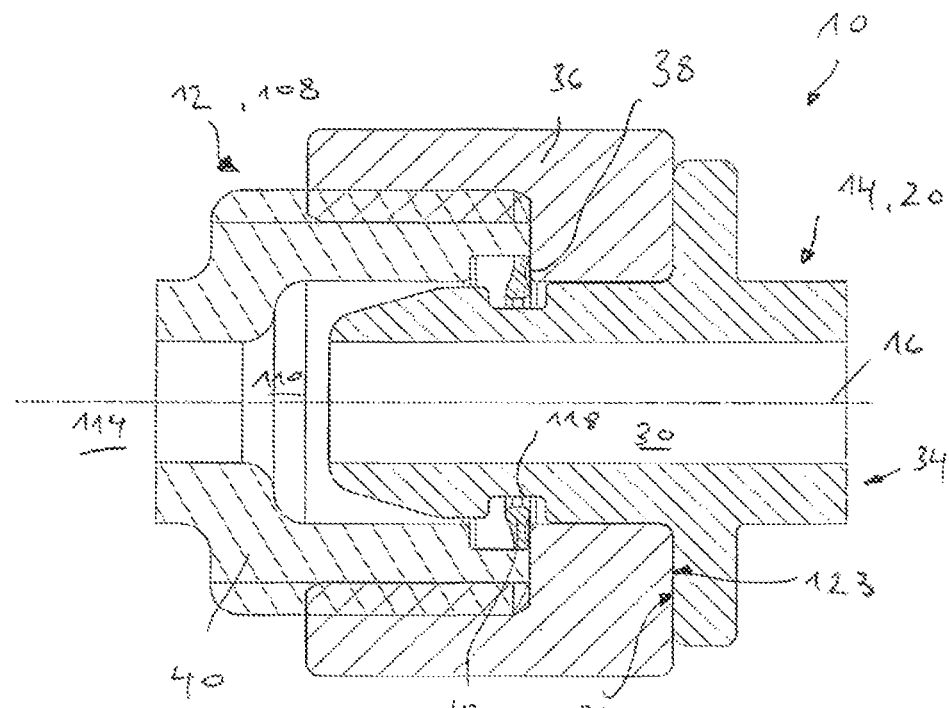
FIG. 24 is a view showing the connection arrangement of FIG. 22 in a first mounted state.

Further movement of first assembly 12 and second assembly 14 toward each other causes locking element 42 to be positioned at the level of locking element receptacle 118 (see FIG. 24). This allows locking element 42 to assume its undeformed rest state again. In this mounted state of connection arrangement 10, engagement surface 72 of second assembly 14 bears against an engagement portion 123 of stop carrier 36 (see FIG. 24).

Figure 25:
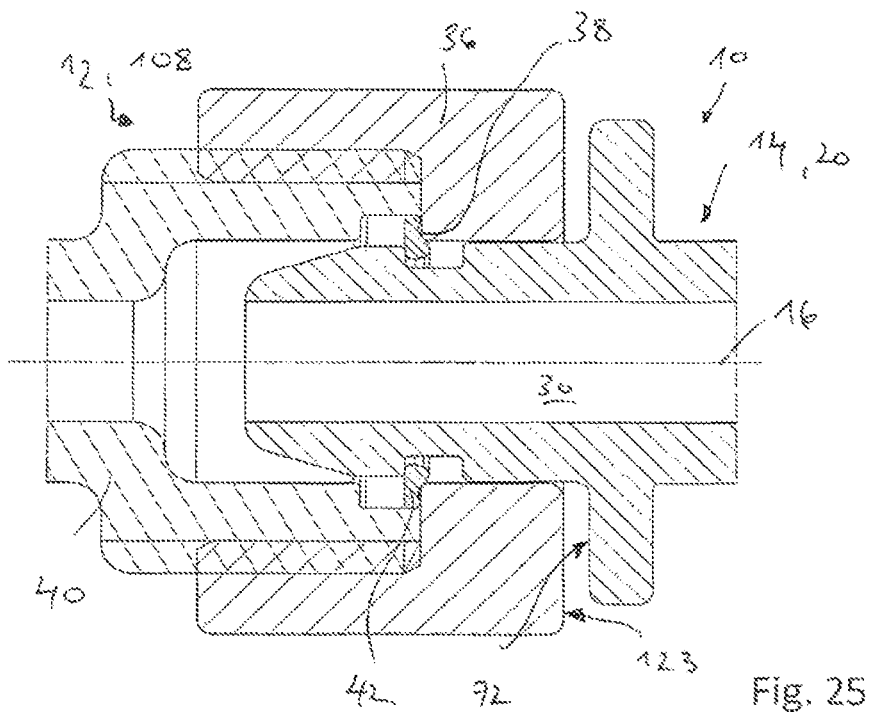
FIG. 25 is a view showing the connection arrangement of FIG. 22 in a second mounted state.

Locking element 42 forms an undercut which counteracts detachment of the second assembly 14 (withdrawal of second assembly 14 from first assembly 12 along mounting axis 16) (see FIG. 25).

When connection arrangement 10 is in the mounted state, stop 38 is in its operative position, in which locking element 42 is deformable against stop 38 (see FIG. 25). This may be associated with a slight lifting off of engagement surface 72 of second assembly 14 from engagement portion 123 of stop carrier 36 (see FIG. 25). In the mounted state shown in FIG. 25, it is possible to exert maximum holding forces, which prevent detachment of the two assemblies 12

Figure 26:
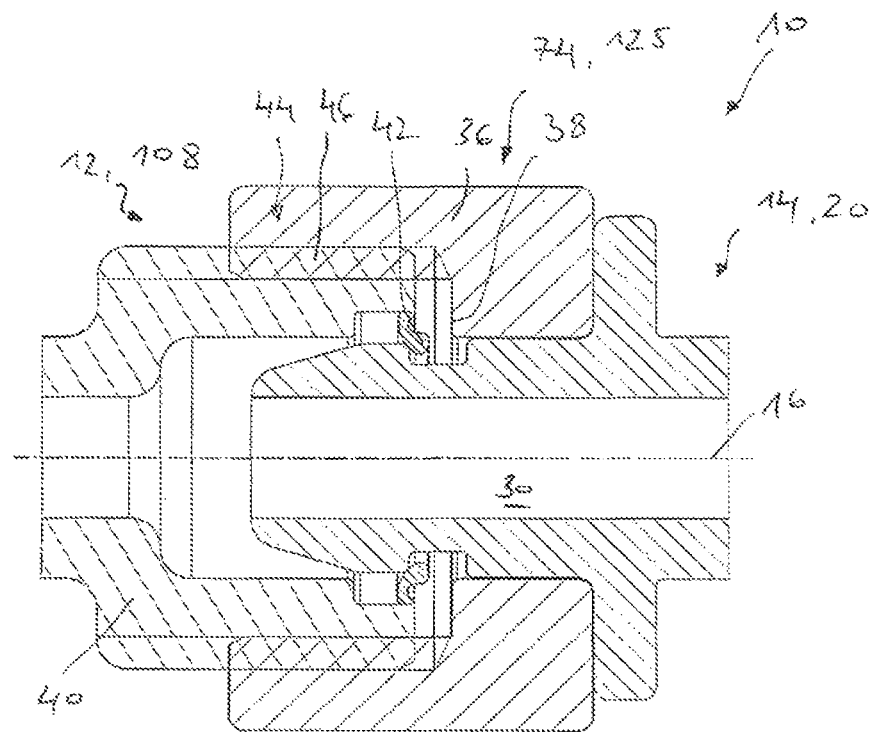
FIG. 26 is a view showing the connection arrangement of FIG. 22 in a first detachment phase.
Figure 27:
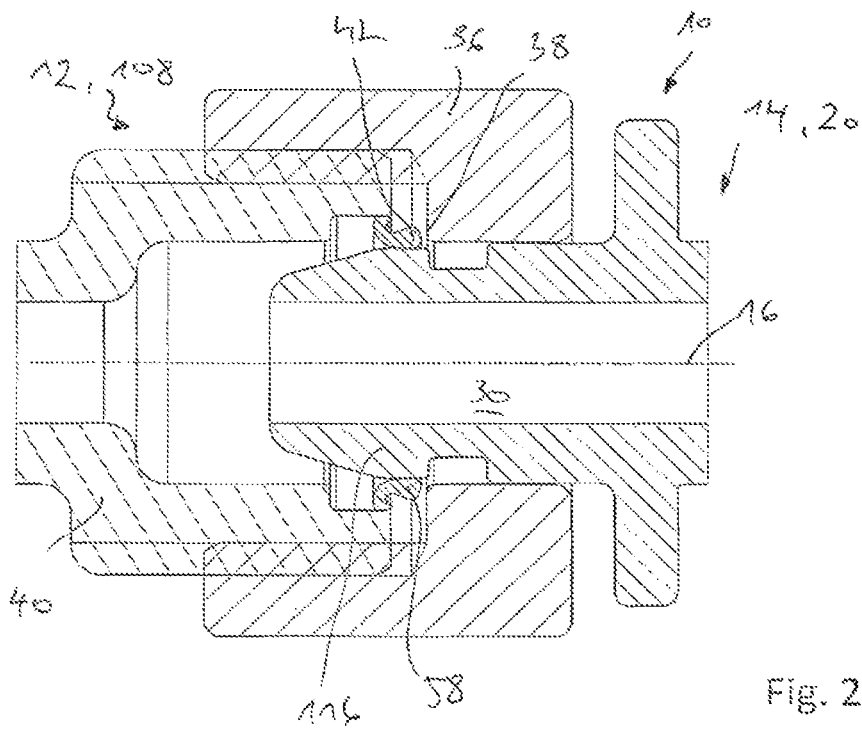
FIG. 27 is a view showing the connection arrangement of FIG. 22 in a second detachment phase.

In order to detach the two assemblies 12 and 14 with low detachment forces, stop 38 and locking element 42 are moved further apart relative to each other when viewed along mounting axis 16 (see FIG. 26). To this end, locking element carrier 40 and stop carrier 36 are rotated relative to each other by means of screw thread 46 so that the distance between locking element 42 and stop 38 is increased according to the pitch of the screw thread 46. In this connection, stop carrier 36 forms a threaded sleeve 125 as part of an actuating device 74. The increase in distance allows locking element 42 to deform, unhindered by stop 38, into a detachment condition during the detachment of the two assemblies, the portion 58 of locking element 42 bearing against insertion head 116 of connector stub 20 (see FIG. 27).

Figure 28:
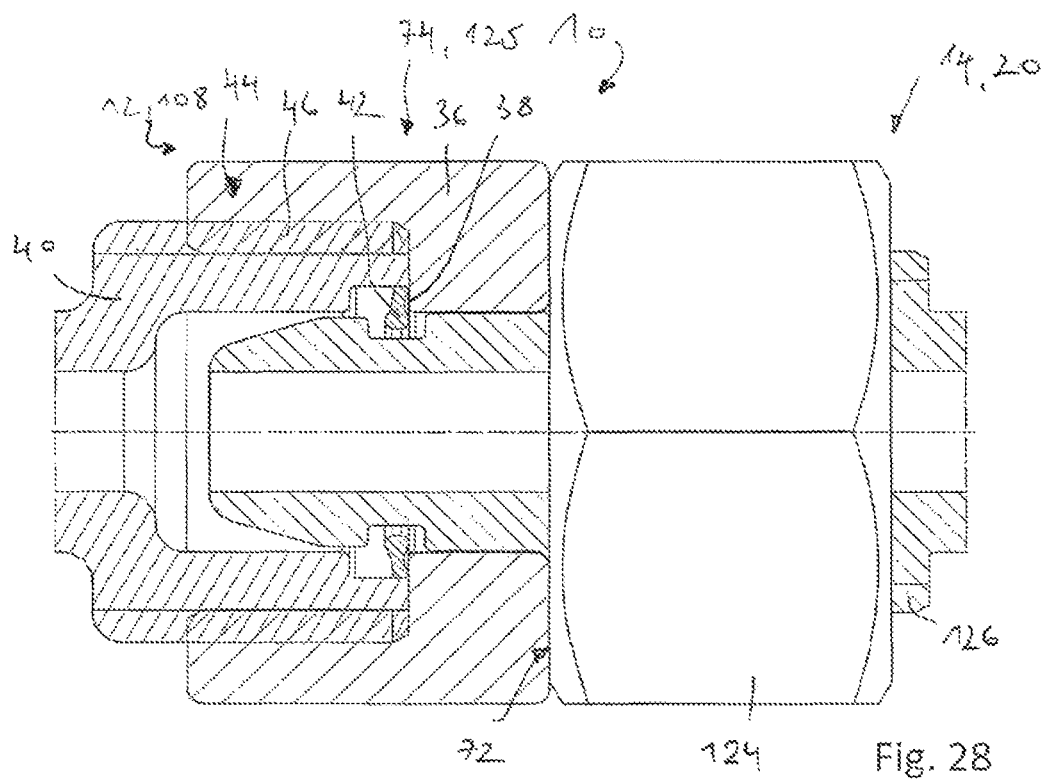
FIG. 28 is a sectional side view of another embodiment of a connection arrangement including a container and a connector stub, shown in a first mounted state.
Figure 29:
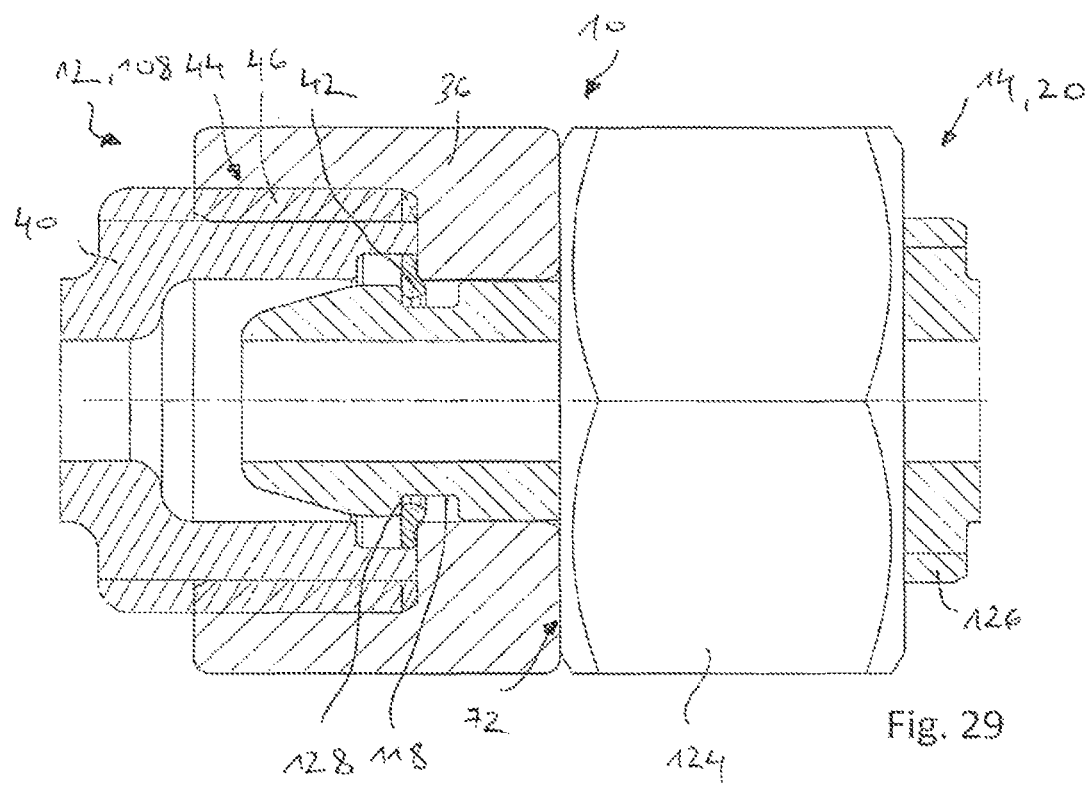
FIG. 29 is a view showing the connection arrangement of FIG. 28 in a second mounted state.

A further connection arrangement 10 shown in FIGS. 28 and 29 is substantially identical in design to the connection arrangement 10 described above with reference to FIGS. 22 through 27. The feature that is specific to the connection arrangement 10 according to FIGS. 28 and 29 is that engagement surface 72 of second assembly 14 is movably disposed on second assembly 14.

For example, engagement surface 72 is formed on a nut 124 threadedly connected to connector stub 20 by means of a thread 126. By changing the position of engagement surface 72 relative to connector stub 20, second assembly 14 can be fixed relative to first assembly 12 in such a manner that when connection arrangement 10 is in the mounted state, latching element 42 is received without play in locking element receptacle 118 and bears against a boundary 128 of locking element receptacle 118 (see FIG. 29).

A connection arrangement 10 shown in FIG. 30 has the special feature that first assembly 12 is configured as a duplex coupling 130 and serves to connect two second assemblies 14, which are each in the form of a connector stub 20. The design of these connector stubs 20 corresponds to the connector stubs 20 described above with reference to FIGS. 21 through 29. The connector stubs 20 of the connection arrangement 10 according to FIG. 30 may each also have an engagement surface 72 that is integrally formed therewith or movable.

The two connector stubs 20 are insertable into interior space 110 of first assembly 12 in directions toward each other along mounting axis 16. First assembly 12 has a tubular locking element carrier 40 having locking elements 42 disposed at opposite ends and designated as 42a and 42b in FIG. 30. These locking elements 42a and 42b are each associated with a locking element receptacle 118 of a respective one of the two connector stubs 20.

First assembly 12 further includes two stop carriers 36a and 36b having respective stops 38a and 38b. Stop carriers 36a, 36b are movable relative to locking element carrier 40 along mounting axis 16 by means of respective bearing sections 44a, 44b having a screw thread 46a, 46b. In this connection, stop carriers 36a, 36b each form a threaded sleeve 125a, 125b as part of a respective actuating device 74a, 74b.

The connection arrangement 10 according to FIG. 30 is used, in particular, to allow conveyance of fluid from a distal end 34 of a first connector stub 20 through interior space 110 of first assembly 12 into fluid conduit 30 of second connector stub 20 and to the distal end 34 thereof. It is understood that the respective distal ends 34 may be adjoined by pipes, hoses, or containers.

As for other aspects of the design and operation of connection arrangement 10, reference is made to the above description relating to FIGS. 21 through 29.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A connection arrangement, comprising:
a first assembly and a second assembly; and
an elastically deformable locking element disposed on the first assembly, the locking element being configured to releasably interlock the first assembly and the second assembly and, during mounting of the first assembly and the second assembly, to deform into a mounting condition and, after completion of the mounting, to form an undercut which counteracts detachment of the first assembly and the second assembly,
wherein the first assembly has a stop which is movable between an operative position, which assists in maintaining the undercut of the locking element and in which the locking element bears against the stop and/or in which the locking element is deformable against the stop, and a detachment position, in which the stop, in relation to the operative position, is spaced further apart from the locking element and in which the locking element is deformable into a detachment condition for detachment of the first assembly and the second assembly.

2. The connection arrangement as recited in claim 1, wherein the first assembly has a stop carrier on which the stop is disposed and a locking element carrier on which the locking element is disposed, and wherein the locking element carrier and the stop carrier are connected via a bearing section in such a way that the locking element carrier and the stop carrier are movable relative to each other.

3. The connection arrangement as recited in claim 2, wherein the bearing section includes a screw thread and/or a linear guide.

4. The connection arrangement as recited in claim 2, wherein the first assembly has a spring which acts on the stop carrier and/or on the locking element carrier so that the stop is urged into the operative position.

5. The connection arrangement as recited in claim 2, wherein the stop carrier and/or the locking element carrier has/have at least one manipulation surface and/or at least one tool engagement surface.

6. The connection arrangement as recited in claim 2, wherein the second assembly has an engagement surface configured to engage against the stop carrier or against the locking element carrier.

7. The connection arrangement as recited in claim 6, wherein the engagement surface is movably disposed on the second assembly.

8. The connection arrangement as recited in claim 2, wherein the stop carrier or the locking element carrier is disposed on or provided by a tubular member.

9. The connection arrangement as recited in claim 1, wherein the first assembly has an actuating device by which the stop is transferrable to the detachment position.

10. The connection arrangement as recited in claim 9, wherein the actuating device includes a thrust bolt or threaded bolt and/or a thrust sleeve or threaded sleeve.

11. The connection arrangement as recited in claim 9, wherein the actuating mechanism is configured to fix the stop in the detachment position.

12. The connection arrangement as recited in claim 1, wherein one of the first assembly and the second assembly has at least one connector stub.

13. The connection arrangement as recited in claim 12, wherein the connector stub has a fluid conduit which extends along a mounting axis of the connection arrangement.

14. The connection arrangement as recited in claim 1, wherein one of the first assembly and the second assembly has a container or a coupling having at least one opening configured to receive a connector stub.

15. The connection arrangement as recited in claim 1, wherein the first assembly has a counter-support configured to engage against the second assembly, and wherein the counter-support is movably disposed on the first assembly.

16. The connection arrangement as recited in claim 15, wherein the counter-support has at least one manipulation surface and/or at least one tool engagement surface.

17. The connection arrangement as recited in claim 1, wherein the stop, in the operative position, bears against a supporting surface of the first assembly, the supporting surface being disposed adjacent the locking element and/or against a portion of the locking element.

18. The connection arrangement as recited in claim 1, wherein the locking element is configured to deform, during mounting of the first assembly and the second assembly, from an undeformed rest state of the locking element into the mounting condition, wherein the locking element, in the detachment position of the stop, is deformable from the undeformed rest state into the detachment condition, and wherein the mounting condition and the detachment condition are associated with deformations of the locking element in opposite directions relative to the undeformed rest state.

* * * * *